US012795521B2

(12) United States Patent
Dutta et al.

(10) Patent No.: US 12,795,521 B2
(45) Date of Patent: Nov. 10, 2026

(54) INITIAL ACCESS WITH A LICENSED-TO-UNLICENSED FREQUENCY-TRANSLATING NETWORK CONTROLLED REPEATER

(71) Applicant: QUALCOMM Incorporated, San Diego, CA (US)

(72) Inventors: Sourjya Dutta, San Diego, CA (US); Navid Abedini, Basking Ridge, NJ (US); Kapil Gulati, Belle Mead, NJ (US)

(73) Assignee: Qualcomm Incorporated, San Diego, CA (US)

( * ) Notice: Subject to any disclaimer, the term of this patent is extended or adjusted under 35 U.S.C. 154(b) by 324 days.

(21) Appl. No.: 18/437,037

(22) Filed: Feb. 8, 2024

(65) Prior Publication Data

US 2025/0261090 A1 Aug. 14, 2025

(51) Int. Cl.
*H04W 48/16* (2009.01)
*H04L 5/00* (2006.01)
(Continued)

(52) U.S. Cl.
CPC ........... *H04W 48/16* (2013.01); *H04L 5/0053* (2013.01); *H04W 48/12* (2013.01); *H04W 74/0833* (2013.01)

(58) Field of Classification Search
CPC ..... H04W 48/00; H04W 48/16; H04W 48/08; H04W 48/12; H04W 74/00; H04W 74/08;
(Continued)

(56) References Cited

U.S. PATENT DOCUMENTS 6,404,775 B1 * 6/2002 Leslie .................. H04B 7/2606 455/7
2003/0153316 A1 * 8/2003 Noll ...................... H04W 16/28 455/562.1
(Continued)

FOREIGN PATENT DOCUMENTS

WO WO-2023011208 A1 * 2/2023 ............. H04B 7/155

*Primary Examiner* — Warner Wong
(74) *Attorney, Agent, or Firm* — Patterson + Sheridan, L.L.P./ Qualcomm

(57) ABSTRACT

Certain aspects of the present disclosure provide techniques for initial access with licensed-to-unlicensed frequency-translating network controlled repeaters (FT-NCRs). A method for wireless communication by a user equipment (UE) includes receiving a synchronization signal (SS) burst from a repeater on an unlicensed frequency band associated with an unlicensed synchronization raster. The SS burst includes an SS block (SSB) and a physical broadcast channel (PBCH) carrying a master information block (MIB) indicating an initial control resource set (CORESET) via a mapping associated with the unlicensed frequency band. The method includes monitoring the initial CORESET based on the MIB and the mapping associated with the unlicensed frequency band for a physical downlink control channel (PDCCH) transmission scheduling a physical downlink shared channel (PDSCH) transmission carrying an initial system information block (SIB) associated with a serving cell that uses a licensed frequency band associated with a licensed synchronization raster.

20 Claims, 15 Drawing Sheets

(51) Int. Cl.
*H04W 48/12* (2009.01)
*H04W 74/0833* (2024.01)

(58) Field of Classification Search
CPC ....... H04W 74/0833–0858; H04L 5/00; H04L 5/003; H04L 5/0053
See application file for complete search history.

(56) References Cited

U.S. PATENT DOCUMENTS

| | | | | |
|---|---|---|---|---|
| 2005/0256963 | A1* | 11/2005 | Proctor, Jr. | H04W 16/26 709/230 |
| 2006/0281404 | A1* | 12/2006 | Lee | H04B 7/2606 455/11.1 |
| 2016/0285537 | A1* | 9/2016 | Maaref | H04L 5/0055 |
| 2020/0382200 | A1* | 12/2020 | Hormis | H04B 7/15542 |
| 2025/0039927 | A1* | 1/2025 | Fang | H04W 16/14 |
| 2025/0159672 | A1* | 5/2025 | Yang | H04L 5/0053 |
| 2025/0234206 | A1* | 7/2025 | Lee | H04W 24/10 |
| 2025/0261143 | A1* | 8/2025 | Dutta | H04W 72/1273 |
| 2025/0338161 | A1* | 10/2025 | Zhou | H04L 5/0048 |

* cited by examiner

INITIAL ACCESS WITH A LICENSED-TO-UNLICENSED FREQUENCY-TRANSLATING NETWORK CONTROLLED REPEATER

FIELD OF THE DISCLOSURE

Aspects of the present disclosure relate to wireless communications, and more particularly, to techniques for initial access procedures in a wireless communication network with licensed-to-unlicensed frequency-translating network-controlled repeaters (FT-NCRs).

DESCRIPTION OF RELATED ART

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes receiving a synchronization signal (SS) burst from a repeater on an unlicensed frequency band associated with an unlicensed synchronization raster, wherein the SS burst includes an SS block (SSB) and a physical broadcast channel (PBCH) carrying a master information block (MIB) indicating an initial control resource set (CORESET) via a mapping associated with the unlicensed frequency band; and monitoring the initial CORESET based on the MIB and the mapping associated with the unlicensed frequency band for a physical downlink control channel (PDCCH) transmission scheduling a physical downlink shared channel (PDSCH) transmission carrying an initial system information block (SIB) associated with a serving cell that uses a licensed frequency band associated with a licensed synchronization raster.

Another aspect provides a method for wireless communication by a network entity. The method includes configuring a repeater associated with the network entity to translate transmissions from the network entity to an unlicensed frequency band associated with an unlicensed synchronization raster; and outputting a synchronization signal (SS) burst to a user equipment (UE) on a licensed frequency band associated with a licensed synchronization raster, wherein the SS burst includes an SS block (SSB) and a physical broadcast channel (PBCH) carrying a master information block (MIB) indicating an initial control resource set (CORESET) via a mapping associated with the unlicensed frequency band.

Another aspect provides a method for wireless communication by a repeater. The method includes receiving, from a network entity, a synchronization signal (SS) burst on a licensed frequency band associated with a licensed synchronization raster, wherein the SS burst includes an SS block (SSB) and a physical broadcast channel (PBCH) carrying a master information block (MIB) indicating an initial control resource set (CORESET) via a mapping associated with an unlicensed frequency band; and forwarding the SS burst to a user equipment (UE) on the unlicensed frequency band with an unlicensed synchronization raster.

Other aspects provide: an apparatus operable, configured, or otherwise adapted to perform any one or more of the aforementioned methods and/or those described elsewhere herein; a non-transitory, computer-readable media comprising instructions that, when executed (e.g., directly, indirectly, after pre-processing, without pre-processing) by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for initial access with a licensed-to-unlicensed frequency translating network controlled repeater (FT-NCR).

The FT-NCR has a control link and backhaul link with a network entity (e.g., a base station (BS)) and one or more access links with a user equipment (UE). The network entity receives control information from the network entity over the control link to control the amplify, frequency translation, and forwarding operations of the FT-NCR.

According to certain aspects, the FT-NCR receives synchronization signal (SS) bursts from the network entity over a licensed frequency band (e.g., via the backhaul link or Uu interface), translates the SS bursts to an unlicensed frequency band (e.g., associated with the access link) and forwards the translated SS bursts to the UE over the access link on the unlicensed frequency band. In some aspects, the network entity sends additional SS bursts for the FT-NCR operation. In some cases, the additional SS bursts are transmitted on a non-legacy synchronization raster detectable by the FT-NCR.

The network entity provides system information in a master information block (MIB) of a physical broadcast channel (PBCH) of the SS burst indicating an associated initial control resource set (CORESET). According to certain aspects, for SS bursts over the unlicensed frequency bands, the system information indicating the initial CORESET is based on a MIB-to-CORESET-0 mapping associated with the unlicensed frequency band.

In some aspects, the network entity configures the UE to refrain from decoding physical downlink control channel (PDCCH) resources in the initial CORESET associated with a MIB when the MIB is based on the MIB-to-CORESET-0 mapping associated with the unlicensed frequency band but the UE receives the MIB in the licensed frequency band.

According to certain aspects, the initial system information further provides information for the UE to perform random access in response to SS bursts received over the access link.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

Figure 1:
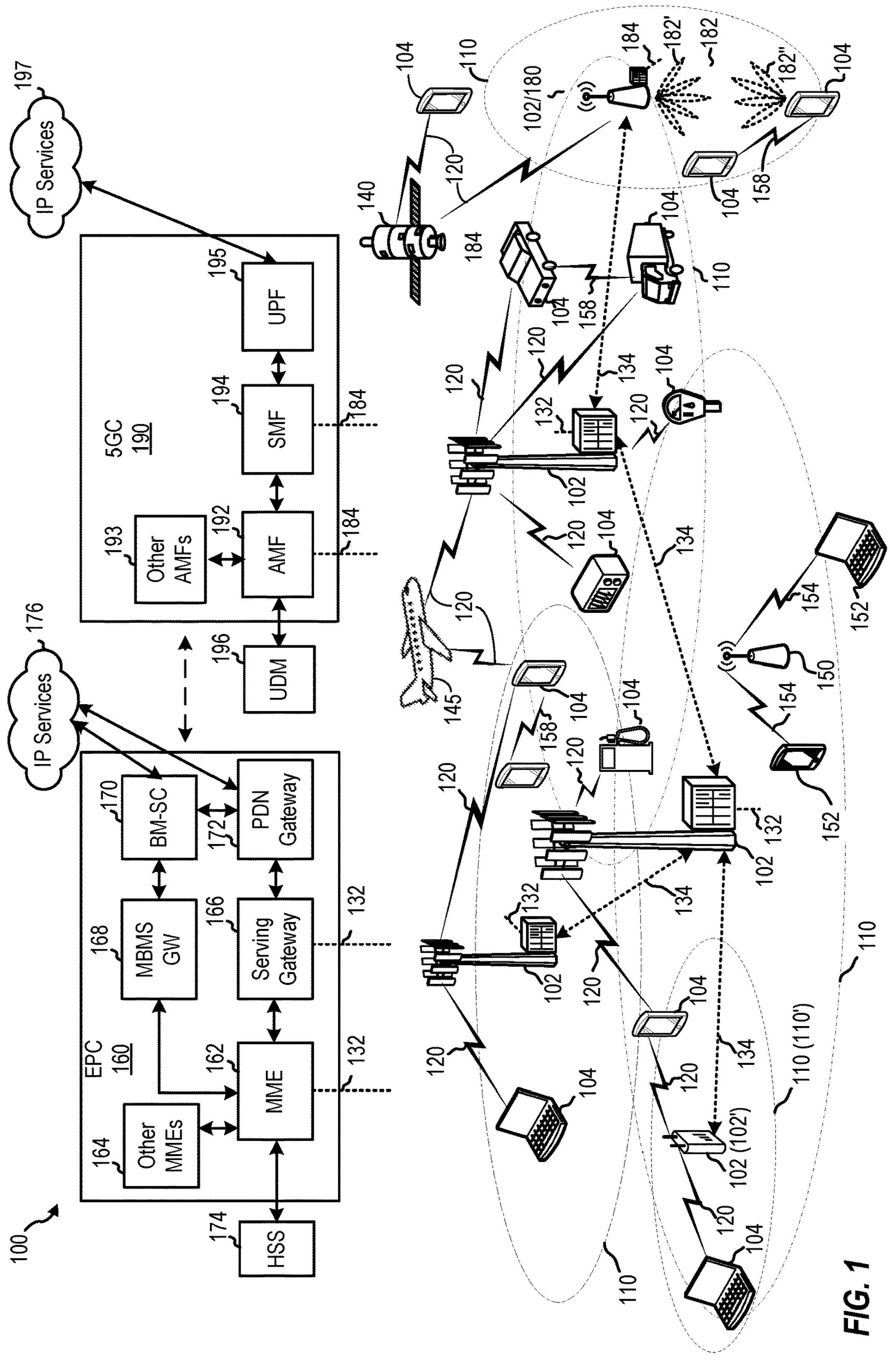
FIG. 1 depicts an example wireless communications network.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (CNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
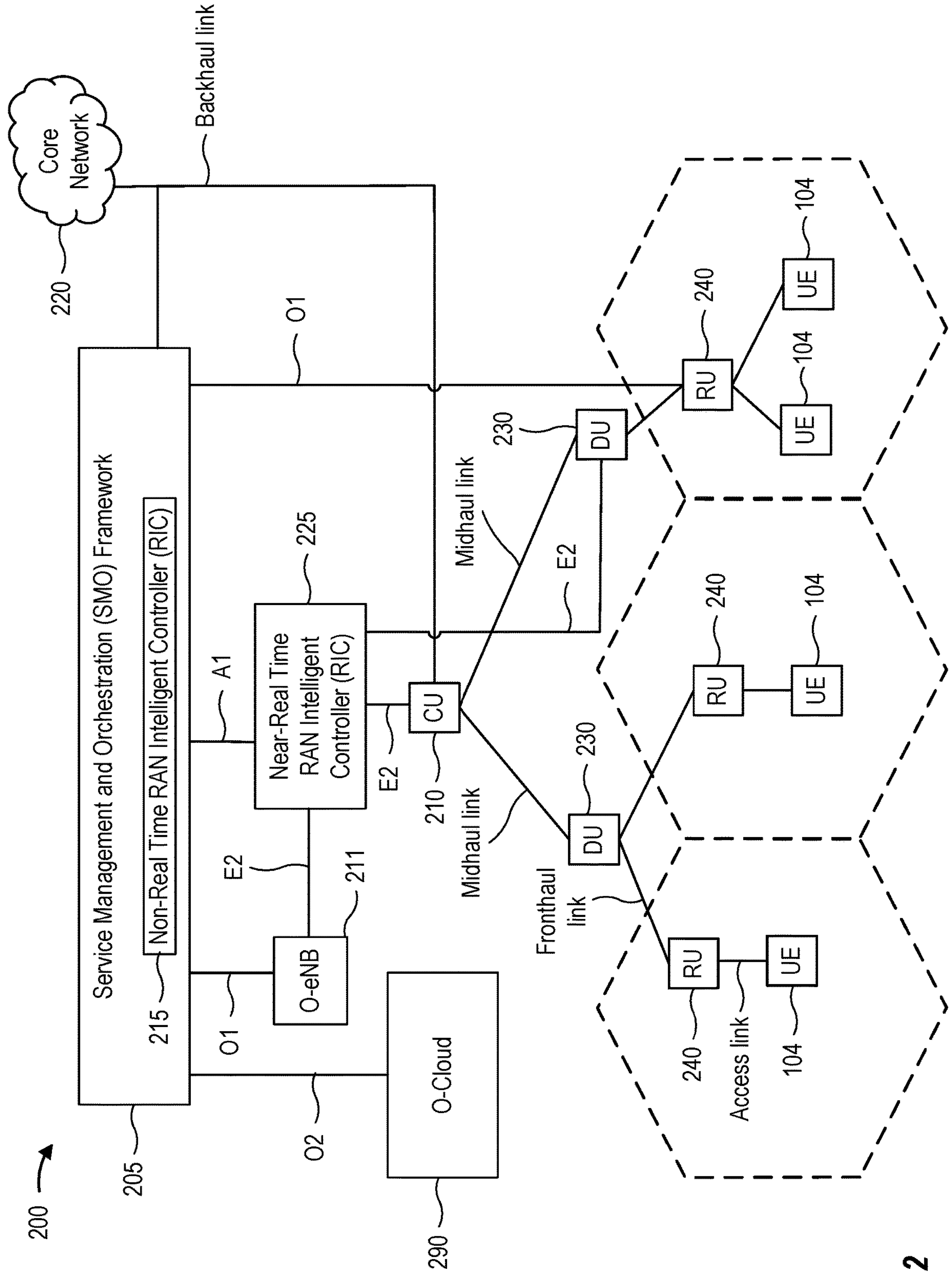
FIG. 2 depicts an example disaggregated BS architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHZ-7125 MHz, which is often referred to (interchangeably) as "Sub-6 GHz". Similarly, 3GPP currently defines Frequency Range 2 (FR2) as including 24,250 MHZ-71,000 MHZ, which is sometimes referred to (interchangeably) as a "millimeter wave" ("mmW" or "mm Wave"). In some cases, FR2 may be further defined in terms of sub-ranges, such as a first sub-range FR2-1 including 24,250 MHz-52,600 MHz and a second sub-range FR2-2 including 52,600 MHz-71,000 MHz. A base station configured to communicate using mm Wave/near mm Wave radio frequency bands (e.g., a mm Wave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via 01) or via creation of RAN management policies (such as A1 policies).

Figure 3:
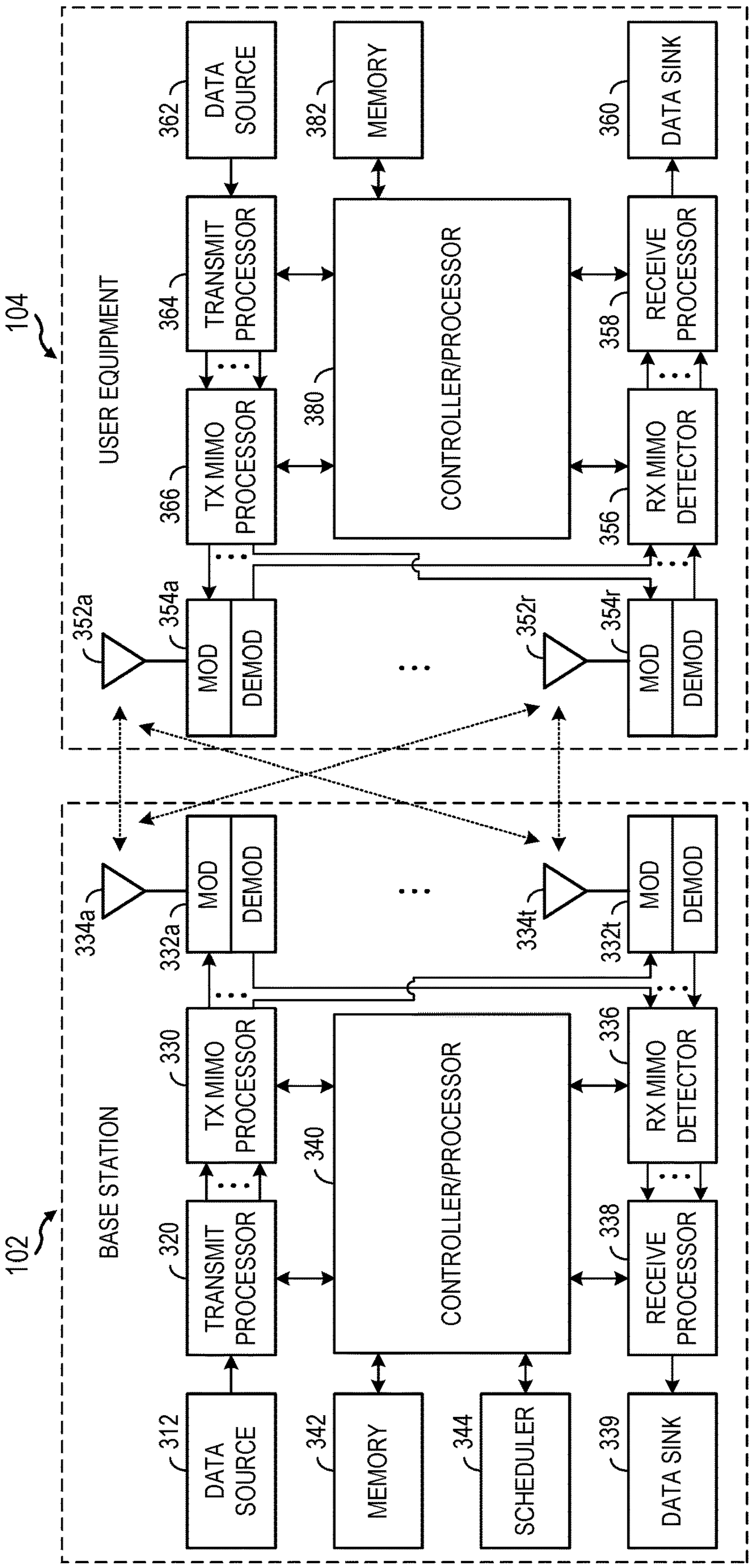
FIG. 3 depicts aspects of an example base station and an example UE.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, one or more processors may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figures 4A, 4B, 4C, 4D:
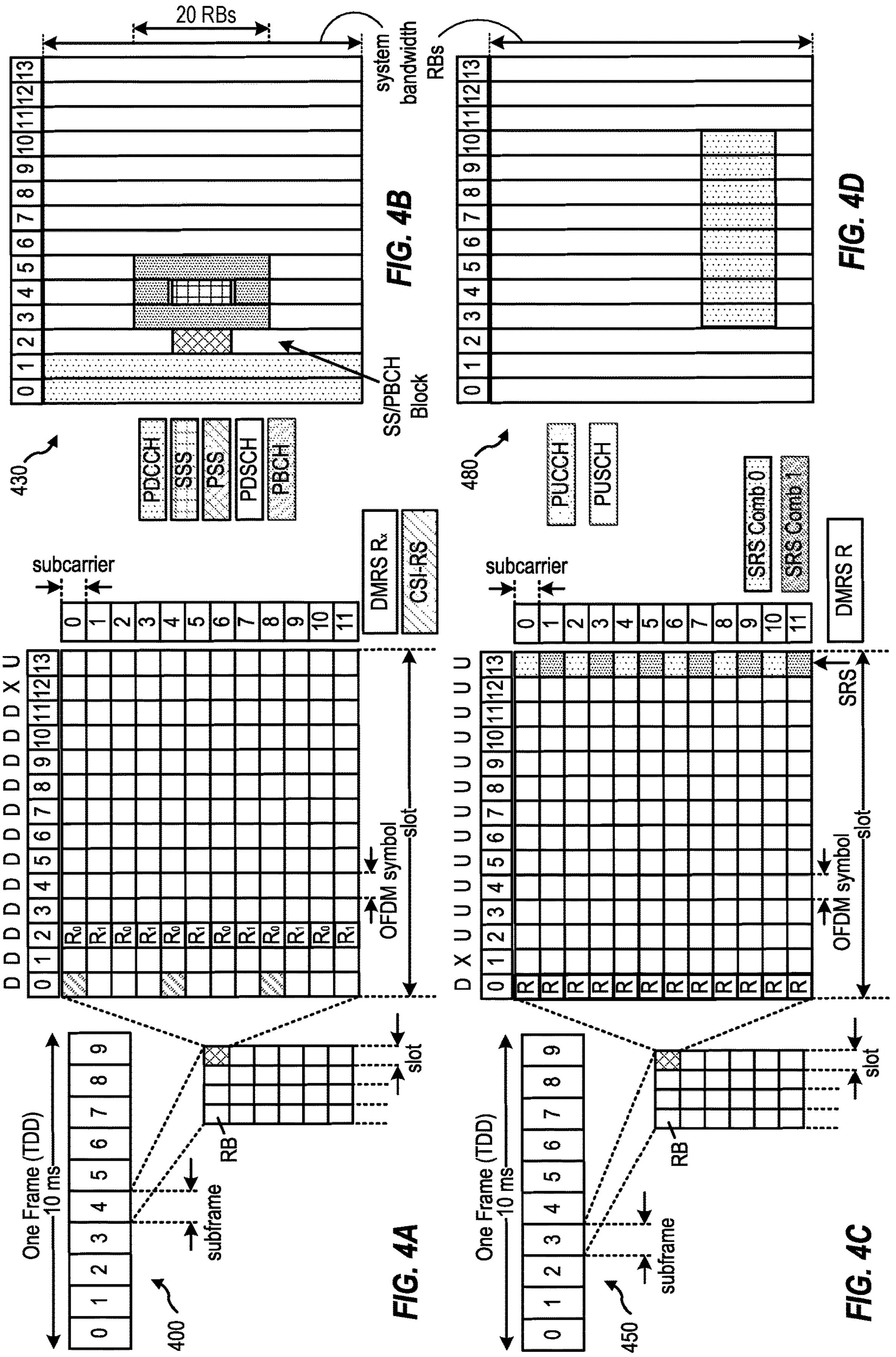
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where Dis DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 6 allow for 1, 2, 4, 8, 16, 32, and 64 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2$\mu$ slots/subframe. The subcarrier spacing and symbol length/duration are a function of the numerology. The subcarrier spacing may be equal to $2^{\mu}\times15$ kHz, where u is the numerology 0 to 6. As such, the numerology $\mu=0$ has a subcarrier spacing of 15 kHz and the numerology $\mu=6$ has a subcarrier spacing of 960 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Aspects Related to Synchronization Raster

In some systems, a channel raster defines radio frequency (RF) reference frequencies. The RF reference frequencies are mapped to resource elements (REs) and resource blocks (RBs) to identify channel positions. The system bandwidth may be partitioned into a number of operating bands in which uplink channels, downlink channels, or both uplink and downlink channels can be used for communications between user equipments (UEs) and network entities (e.g., base stations (BSs)). The channels can be configured with different channel bandwidths. Different UE channel bandwidths support different total numbers of RBs (e.g., the maximum transmission bandwidth configuration), $N_{RB}$. For example, Table 5.3.2-1 of 3GPP TS 38.101-1 v17.7.0 illustrates an example of different $N_{RB}$ dependent on SCS and channel bandwidth in NR.

A global frequency channel raster defines a set of RF reference frequencies, $F_{REF}$. The RF reference frequency is used in signaling to identify the frequency position of RF channels, SSBs, other elements. In 5G NR, the global frequency raster is defined for all frequencies from 0 GHz to 100 GHz. The granularity of the global frequency raster, $\Delta F_{Global}$, defines the frequency step size between the RF reference frequencies. The RF reference frequencies are designated by an NR Absolute Radio Frequency Channel Number (NR-ARFCN), $N_{REF}$. The NR-ARFCN may be in the range (0, 1, . . . , 2016666) on the global frequency raster. The NR-ARFCN can be used to determine an associated RF reference frequency in MHz. For example, $F_{REF}=F_{REF\text{-}Offs}+\Delta F_{Global}(N_{REF}-N_{REF\text{-}Offs})$, where $F_{REF\text{-}Offs}$ and $N_{Ref\text{-}Offs}$ are offset values.

The channel raster defines a subset of the RF reference frequencies that can be used to identify the RF channel position in the uplink and downlink. Each subset of RF reference frequencies are associated with different operating bands. The RF reference frequency for an RF channel maps to a resource element on the carrier. For each operating band, a subset of frequencies from the global frequency raster are applicable for that band and forms a channel raster with a granularity $\Delta F_{Raster}$, which may be equal to or larger than $\Delta F_{Global}$. For example, Table 5.4.2.3-1 of 3GPP TS 38.101-1 v17.7.0 illustrates example NR operating bands mapped to RF reference frequency ranges.

The synchronization raster indicates the frequency positions of the SSB that can be used by the UE for system acquisition when explicit signaling of the synchronization block position is not present.

The frequency position of the SS block, $SS_{REF}$, is defined with a corresponding GSCN. Table 5.4.3.1-1 of 3GPP TS 38.101-1 v17.7.0 illustrates an example of parameters defining the $SS_{REF}$ and GSCN for different frequency ranges. The synchronization raster and the SCS of the SSB may be defined separately for each band. An example of the resource element corresponding to the $SS_{REF}$ is given in clause 5.4.3.2 of 3GPP TS 38.101-1 v17.7.0. An example of a synchronization raster for each band is given in Table 5.4.3.3-1 of 3GPP TS 38.101-1 v17.7.0 with reference to the example SS/PBCH block patterns Cases A-G in Section 4.1 of 3GPP TS 38.213 v17.7.0.

Aspects Related to Licensed-to-Unlicensed Frequency-Translating Network Controlled Repeaters (FT-NCRS)

To improve the coverage and support the increasing number of user equipments (UEs), different methods are considered, among which network densification and millimeter wave (mmw) communications are considered important contributions. Network densification refers to the deployment of multiple access points of different types (e.g., in metropolitan areas. Small nodes, such as relays, integrated access and backhaul (IAB), reconfigurable intelligent surfaces (RIS), and repeaters, may be deployed to assist the communications.

In certain systems, such as 3GPP 5G NR Release 16 and Release 17 systems, IAB nodes are specified as the main relaying nodes. While IAB nodes extend coverage, IAB node are, however, relatively complex.

A RIS may be an electromagnetically active artificial structures with low beamforming capabilities, and hence low accuracy, that can be used to reshape the propagation environment such as to improve capacity, coverage and energy efficiency. A RIS may control electromagnetic properties of the radio frequency (RF) waves by performing an intelligent adaptation of the phase shift (e.g., adapting a phase matrix) towards the desired direction, without performing any decoding.

Figure 5:
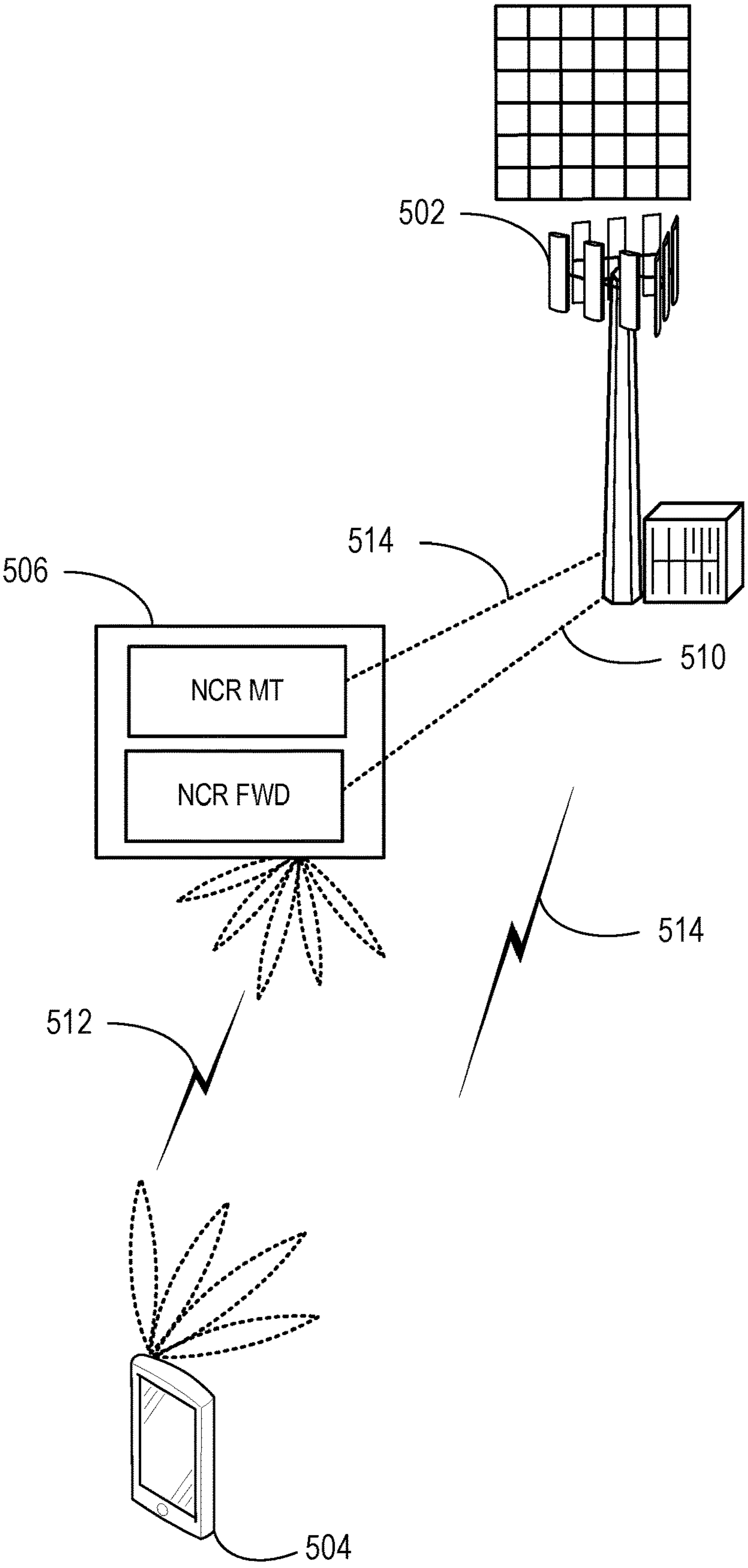
FIG. 5 depicts an example NCF serving a UE for a BS.

Repeaters (e.g., RF repeaters) enhance coverage, but are low complexity devices, significantly reducing operator costs. FIG. 5 depicts an example repeater 506 serving a user equipment 504 (e.g., such as a UE 104 of FIG. 1) for a base station 502 (e.g., such as a BS 102 of FIG. 1).

The repeater 506 may communicate data with the base station 502 over a backhaul link 510, for example, via the NCR forwarding (FWD) function.

The repeater 506 may receive control information from the base station 502 over a control link 514, for example, via the NCR mobile termination (MT). The control information may control the forwarding operation of the repeater 502. In some aspects, the control link 514 is over a Uu interface.

The repeater 506 may forward data from the base station 502 to a UE 504 and/or from the UE 504 to the base station 502 via access link 512. The NCR FWD of the repeater 506 may perform the amplify-and-forwarding operation of uplink and downlink RF signals between the base station 502 and the UE 504. In some aspects, the repeater 506 can maintain the base station-repeater link 510 simultaneously with the repeater-user equipment link 512.

Currently, such repeaters may be fully network-controlled. An NCR may amplify-and-forward signals that the NCR receives without performing any decoding. The NCR may use transmit and receive beamforming to control interference. The NCR can be logically a part of the base station for management purposes.

In some aspects, NCRs are in-band RF repeaters used for extension of network coverage in the FR1 and FR2 bands and may operate transparently to the UE. After power amplification and with beamforming, the NCR forwards a received RF signal in the uplink or downlink. Since the NCR-forward only amplifies and beamforms the RF signal, the NCR may not use any advanced digital receiver or transmitter chains. In some examples, the NCR is transparent to the UE.

In some aspects, an NCR may be frequency translating NCR (FT-NCR). The FT-NCR, in addition to the amplify and forward operations, translates the signal received on a first frequency band and outputs the signal on a second frequency band. For example, the FT-NCR may output the signal on a band with low load for last-mile connectivity to UEs in the cell edge. In some cases, the FT-NCR may output the signal on another licensed band or on an unlicensed band. Use of an unlicensed band may mitigate interference to other UEs.

In the illustrative example discussed herein, the base station transmits the control information to the FT-NCR over the Uu interface on the control link on a first frequency band $$f_c^1$$

(a licensed frequency band). The base station communicates data with a UE by transmitting towards the FT-NCR over the backhaul link on a second frequency band $$f_c^2$$

(a licensed frequency band). The FT-NCR forwards the data from the base station with the UE over the access link is on a third frequency band $$f_c^3$$

(an unlicensed frequency band). In some cases, the first frequency band for the control link is the same frequency band as the second frequency band for the backhaul and a different frequency band than the third frequency band for the access link. In some cases, the base station also transmits to the UE using the first frequency band or the second frequency band.

Figure 6A:
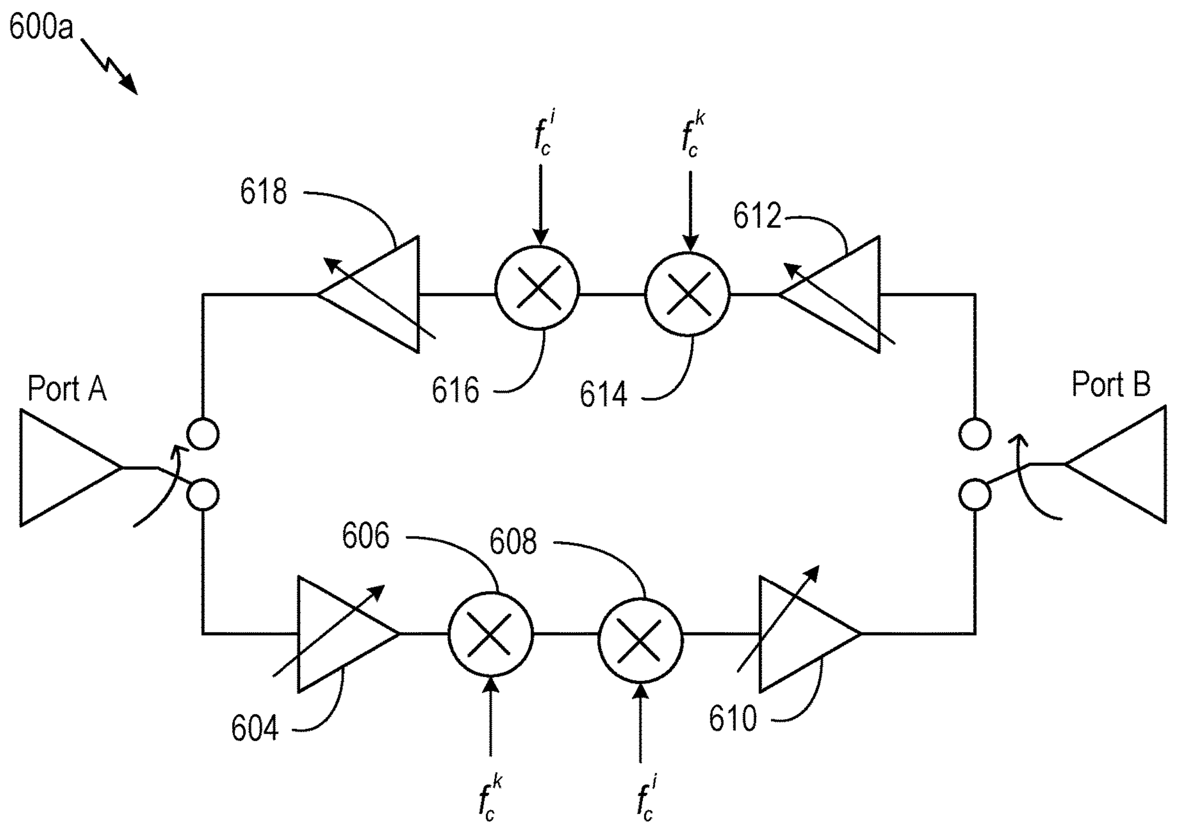
FIG. 6A depicts an example analog FT-NCR.

FIG. 6A depicts an example analog FT-NCR 600*a*. The analog FT-NCR 600*a* receives a signal over antenna port A. The analog Ft-NCR 600*a* amplifies the signal, for example, using low noise amplifier (LNA) 604, translates the received signal frequency band $$f_c^k$$

to baseband or intermediate frequency (IF) at frequency converter 606, up-converts the signal to output signal frequency band $$f_c^i$$

at frequency converter 608, amplifies the signal using LNA 610, and outputs the signal over the antenna port B. For a signal in the other direction, the analog FT-NCR 600*a* receives a signal over antenna port B, amplifies the signal, for example, using LNA 612, translates the received signal frequency band $$f_c^k$$

to baseband (or IR) at frequency converter 614, up-converts the signal to output signal frequency band $$f_c^i$$

at frequency converter 616, amplifies the signal using LNA 618, and outputs the signal over the antenna port A.

Figure 6B:
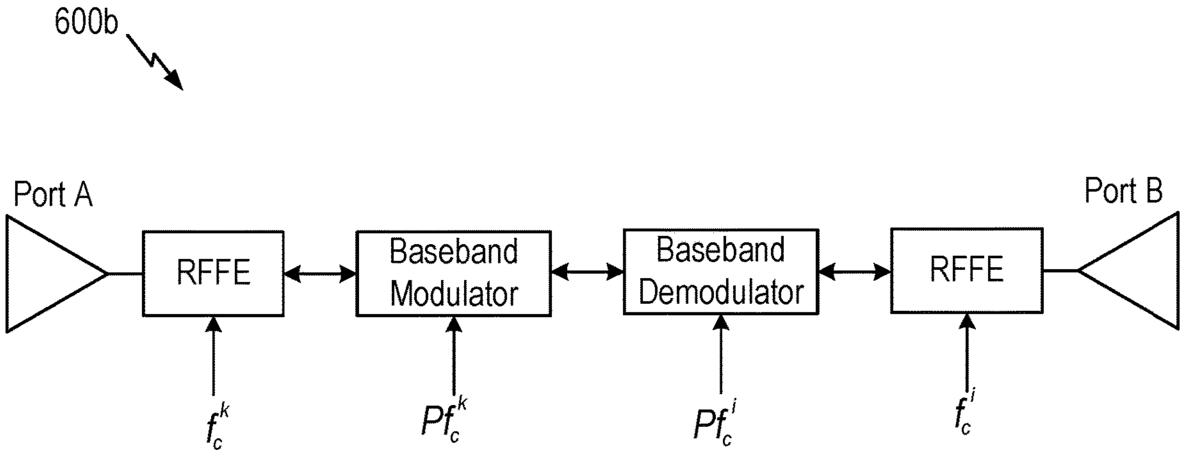
FIG. 6B depicts an example digital FT-NCR.

FIG. 6B depicts an example digital FT-NCR 600*b*. After the digital FT-NCR 600*b* RF front-end (RFFE) receives the input signal over antenna port A on the received signal frequency band $$f_c^k,$$

the digital FT-NCR 600*b* digitally translates the frequency though the baseband modulator modulating the signal with modulation parameters $$Pf_c^k$$

and the baseband demodulator demodulating the signal with demodulation parameters $$Pf_c^i.$$

The RFFE outputs the signal on the output signal frequency band $$f_c^i.$$

While FT-NCRs allow for coverage extension, because the FT-NCR may be transparent to the UE, the UE needs to be aware that signals being repeated by the FT-NCR are from the same cell as the original signal transmissions from the base station in order to distinguish the signals associated with the cell from signals transmitted by other neighbor cells. For example, the UE may need to identify synchronization signal block (SSB) transmissions received from the FT-NCR as associated with the cell, even though they are received on a different frequency band, in order to perform a random access channel (RACH) procedure with the correct cell.

As mentioned, translation to an unlicensed frequency band may be useful to avoid interference. For example, licensed-to-unlicensed FT-NCRs may be deployed on cars, buses, or other vehicles. Based on the position of the UEs inside the vehicle, the UEs may experience a large variation in signal strength from a base station (BS). For example, a UE on the dashboard inside a car may receive a stronger signal from the BS than a UE in the center console. The FT-NCRs may receive a signal from a base station (BS) using licensed frequency bands and may communicate repeat the signal to nearby UEs using unlicensed frequency band(s). The communication with the UEs using the unlicensed frequency band(s) will not interference with the other nearby UEs that have a good signal with the BS using the licensed frequency band. Further, as licensed spectrum may be expensive, use of the unlicensed frequency band(s) may be more cost effective than performing repetition on the licensed band to improve coverage.

However, while translation to an unlicensed frequency band may improve coverage and avoid interference to the licensed frequency band, enhancements may be needed to initial access and to system information. For example, the SS burst includes the physical broadcast channel (PBCH) carrying the master information block (MIB). The MIB includes information that maps to a control resource set (CORESET) in which the network transmits downlink control information (DCI) in a physical downlink control channel (PDCCH) search space to schedule a physical downlink shared channel (PDSCH) with the initial system information. The UE needs to be able to identify that the SS burst and the initial system information, received on the unlicensed frequency band over the access link, is associated with a particular cell (e.g., associated with the serving cell). For example, the UE may distinguish the translated SS burst and initial system information as part of extended licensed operation through licensed-to-unlicensed FT-NCR rather than NR unlicensed (NR-U) operation. For example, the mapping of the MIB to the initial CORESET (CORESET-0) is different for the licensed and unlicensed operation. Accordingly, if the UE, receiving the MIB over the unlicensed frequency band, uses the unlicensed mapping to determine a CORESET to monitor, the UE will not find the CORESET because the MIB carries information mapping to the CORESET in the licensed spectrum.

Thus, enhancements are needed to allow the UE to receive system information over the unlicensed frequency band. In addition, as NCR operation may be transparent to the UE, it may be desirable that the enhancements allow the UE to receive the system information over the unlicensed frequency band without prior knowledge of the frequency translation operation.

Aspects Related to Enhanced Initial Access with FT-NCRs

According to certain aspects, the network configures a frequency translating network controlled repeater (FT-NCR) to translate synchronization signal (SS) burst transmissions received on a licensed frequency band from a network entity to an access link unlicensed frequency band and forwards the translated SS burst transmissions to a user equipment (UE) over the access link. In some aspects, the FT-NCR translates the SS burst transmission to a synchronization raster associated with the unlicensed frequency band. In some aspects, the synchronization raster is a non-legacy synchronization raster defined for the licensed-to-unlicensed FT-NCR operation. The non-legacy synchronization raster may be monitored for SS bursts only by non-legacy UEs.

In some aspects, the FT-NCR forwards the SS bursts in one or more SSB locations of SSB locations used by the network entity. In some aspects, the network entity transmits additional separate SS bursts for the FT-NCR operation. In some aspects, the FT-NCR forwards the SS bursts in one or more SSB additional SSB locations separate from SSB locations used by the network entity.

The SS burst transmissions include the physical broadcast channel (PBCH) carrying system information including the master information block (MIB). The MIB includes information mapping to a time and frequency location (e.g., in a Type0 PDCCH search space) of an initial control resource set (CORESET-0). According to certain aspects, for one or more SS bursts for the FT-NCR operation, the network entity includes information in the MIB pointing to the CORESET-0 based on the MIB-to-CORESET-0 mapping of the unlicensed spectrum mapping. For example, the index for the CORESET-0 may be based on the indices for the unlicensed SIB-1. Thus, the UE receiving MIB over the access link from the FT-NCR in the unlicensed frequency band will find the CORESET-0 when the UE monitors the CORESET-0 based on the unlicensed spectrum MIB-to-CORESET-0 mapping. The network entity may transmit one or more other SSBs over the direct link (e.g., a Uu link with the UEs over the licensed frequency band) that include MIB with information pointing to the CORESET-0 based on the MIB-to-CORESET-0 mapping of the licensed spectrum mapping.

In some aspects, the system information carried in the PBCH of additional SS bursts, for the FT-NCR operation, includes system information indicating for UEs not to use the SS burst if received over the licensed frequency band and licensed synchronization raster. In some aspects, a UE receiving the SS burst, with the system information indicating not to use the SS burst, will not attempt to monitor and/or decode in the associated initial CORESET indicated by the MIB. This may prevent the UEs from receiving the MIB in the licensed frequency band and determining the CORESET-0 to monitor based on the MIB-to-CORESET-0 mapping of the licensed spectrum mapping, while the MIB information is based on the unlicensed spectrum MIB-to-CORESET-0 mapping, in which case the UE will not find the CORSET-0. In some aspects, the network entity does not transmit the PDCCH and/or the associated SIB-1 in the CORESET-0 location based on the licensed MIB-to-CORESET-0 mapping.

In some aspects, the network entity may prevent the UEs the receiving the MIB in the licensed frequency band with the MIB information based on the unlicensed spectrum MIB-to-CORESET-0 mapping from attempting to monitor and/or decode in the associated initial CORESET indicated by the MIB by transmitting a system information block (SIB) in the associated CORESET indicating that the UEs are barred from using the CORESET.

In some aspects, the network entity sets a flag (e.g., a cellReservedForFutureUse flag) to prevent legacy UEs from attempting to decode PDCCH resources in the initial CORESET.

In some aspects, the network entity configures the FT-NCR with a listen-before-talk (LBT) type of procedure to use before transmitting on the access link. For example, the network entity may configure no LBT to be used or a short Type 2 LBT procedure for the FT-NCR to use before transmitting on the access link.

In some aspects, the network entity configures the FT-NCR with a transmit power reduction to use for transmission on the access link.

The network entity transmits downlink control information (DCI) in a physical downlink control channel (PDCCH) in the initial CORESET. The DCI schedules a physical downlink shared channel (PDSCH) transmission including an initial system information block (SIB1).

The UE receiving the SS burst with the MIB, determines the location to monitor the initial CORESET to monitor based on a mapping of information in the MIB to the initial CORESET. The UE receiving the SS burst in the licensed frequency band determines the location to monitor the initial CORESET to monitor based on a first mapping of information in the MIB to the initial CORESET associated with the licensed spectrum. The UE receiving the SS burst in the unlicensed frequency band determines the location to monitor the initial CORESET to monitor based on a second mapping of information in the MIB to the initial CORESET, different than the first mapping, associated with the unlicensed spectrum. In some aspects, where the UE receives the SS burst on the licensed frequency spectrum, the UE may refrain monitoring the associated CORESET for PDCCH. For example, the UE may receive system information in the SS burst indicating not to monitor the associated CORESET if received over the licensed frequency band or the UE may receive a SIB in the CORESET indicating not to decode the PDCCH in the CORESET.

In some aspects, the initial SIB includes information for the UE to use the access link for the FT-NCR operation.

In some aspects, the initial SIB contains information for a UE to perform RACH in response to SS bursts received over the access link frequency band. For example, the initial SIB may include first information for the UE to perform RACH in response to SS bursts received over the direct link on the licensed frequency band and second information for the UE to perform RACH in response to SS bursts received over the access link on the unlicensed frequency band. In some aspects, the initial SIB may indicate additional RACH resources to account for in an LBT procedure for the unlicensed link. In some examples, the initial SIB may indicate a maximum RACH LBT failure threshold parameter for the access link. In some examples, if the UE is unable to send a RACH request on the access link within the maximum RACH LBT failure threshold due to persistent LBT failures, the UE may stop trying to transmit the RACH request for a fixed period. In some examples, the initial SIB may indicate for the UE to refrain from power boosting on one or more RACH occasions. In some examples, the initial SIB may indicate for the UE to refrain from perform LBT for RACH on the access link or for the UE to perform a short (e.g., Type2) LBT procedure for RACH on the access link. In some examples, the initial SIB may indicate a maximum transmit power for RACH on the access link. In some aspects, the initial SIB indicates an unlicensed frequency band for the UE to use for uplink and/or downlink communication on the access link. For example, the initial SIB may indicate an additional downlink only path, the UE may use the access link to decode DCI and downlink traffic but the UE does not perform RACH on the access link. If the initial SIB indicates an additional uplink only path, the UE may conditionally use the access link to perform RACH, for example, if RACH with the cell has failed, or if the cell signal quality (e.g., reference signal receive power (RSRP)) is below a threshold.

Figure 7:
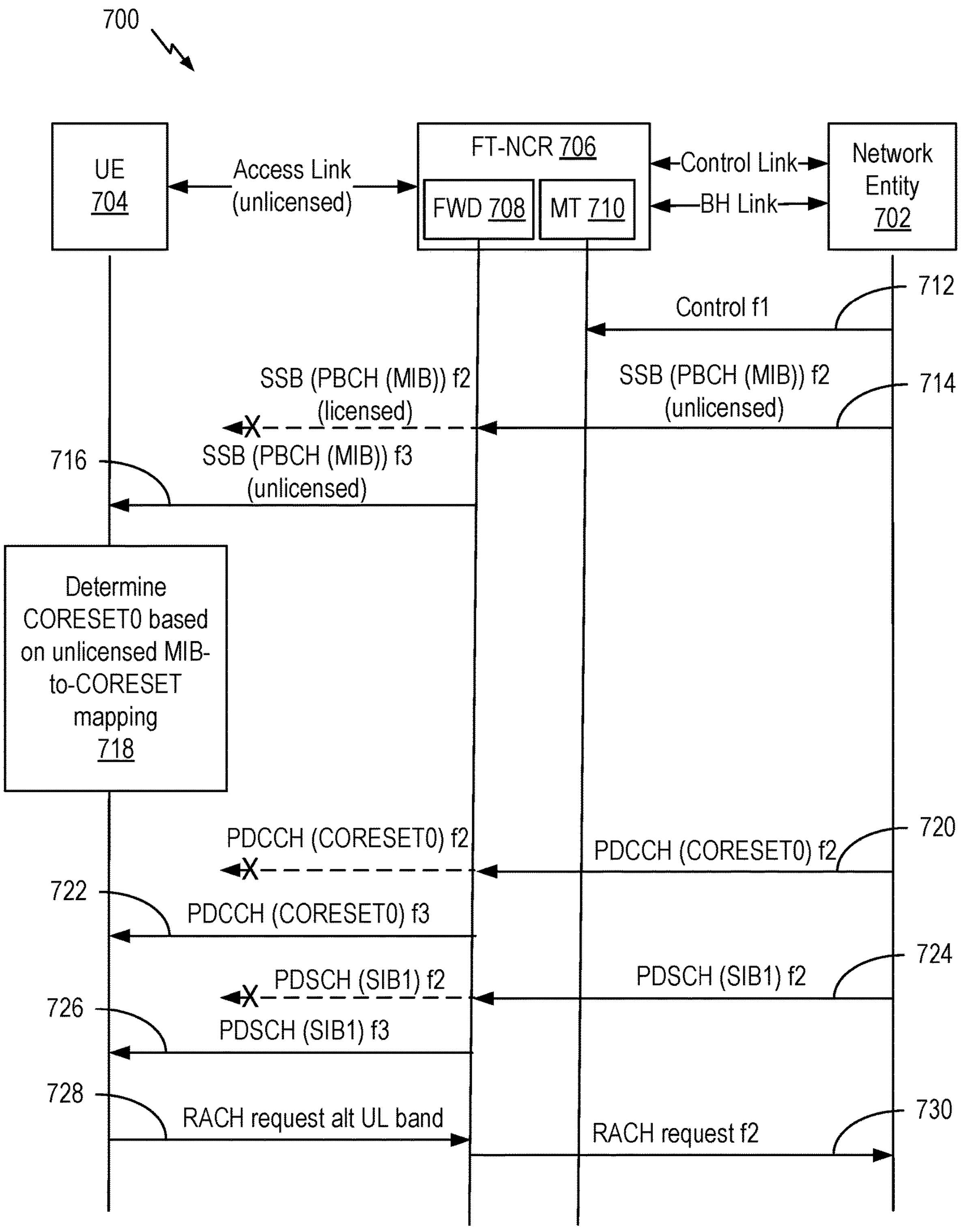
FIG. 7 is a call flow diagram illustrating example operations between a UE, a network entity, and an FT-NCR for licensed-to-unlicensed FT-NCR operations.

FIG. 7 depicts a process flow 700 for communications in a network between a network entity 702, a UE 704, and a FT-NCR 706. In some aspects, the network entity 702 may be an example of the BS 102 depicted and described with respect to FIGS. 1 and 3 or a disaggregated base station depicted and described with respect to FIG. 2. Similarly, the UE 704 may be an example of UE 104 depicted and described with respect to FIGS. 1 and 3. In some aspects, the FT-NCR 706 may be an example of the NCR 506 depicted and described with respect to FIG. 5, the analog NCR 600*a* depicted and described with respect to FIG. 6A, or the digital NCR 600*b* depicted and described with respect to FIG. 6B. However, in other aspects, UE 704 may be another type of wireless communications device, network entity 702 may be another type of network entity or network node, and FT-NCR 706 may be another type of repeater, such as those described herein.

As shown in FIG. 7, the FT-NCR 706 may include a mobile termination (MT) 710 and forwarding 708 logical entities. The MT 710 may receive control information from the network entity 702 over a control link, which may use a first frequency band f1

$$(\text{e.g., } f_c^1).$$

The FWD 708 may receive data from the network entity 702 over a backhaul link, which uses a second frequency band $$(\text{e.g., } f_c^2).$$

The network entity 702 may also communicate with the UE 704 via the Uu interface over a licensed frequency band. In some examples, the licensed frequency band is the first frequency band $$(\text{e.g., } f_c^1)$$

or the second frequency band $$(\text{e.g., } f_c^2).$$

However, the UE 704 may not be able to receive signals from the network entity 702. For example, UE 704 may be a cell edge UE or due to signal interference or the presence of blockers in the network environment. The FWD 708 may repeat the signals received from the network entity 702 to the UE 704 over an access link, which may use a third unlicensed frequency band $$(\text{e.g., } f_c^3).$$

At 712, the network entity 702 may configured the FT-NCR 706 with control information over the control link. The control information may configure the FT-NCR 706 for the licensed-to-unlicensed frequency translation, amplify, and forwarding operations. In some aspects, the network entity 702 configures the FT-NCR 706 with an LBT type of procedure to use before transmitting on the access link. For example, the network entity 702 may configure no LBT to be used or a short Type 2 LBT procedure for the FT-NCR 706 to use before transmitting on the access link. In some aspects, the network entity 702 configures the FT-NCR 706 with a transmit power reduction to use for transmission on the access link.

At 714, the network entity 702 sends a SS burst for the UE 704. The SS burst may be sent via the Uu interface on the second frequency band $$(\text{e.g., } f_c^2)$$

with a first synchronization raster. As shown, the SS burst may not reach the UE 704, but the SS burst may be received by the FT-NCR 706 over the backhaul link.

In some aspects, SS bursts are transmitted periodically. The transmission pattern may be depend on the subcarrier spacing (SCS) and frequency range. Within a window, a set of SS bursts may be transmitted (e.g., up to 64 SSBs transmitted with beam sweeping). The SS burst may include an SSB and a physical broadcast channel (PBCH) carrying a MIB indicating an initial CORESET (e.g., CORESET0). For example, the MIB may include a parameter pdcch-ConfigSIB1 that maps to an initial CORESET, a common search space, and some PDCCH parameters. A CORESET may be a set of physical resources (e.g., a specific area on the downlink resource grid), localized to specific search space regions in the frequency domain, and a set of parameters that is used to carry PDCCH.

According to certain aspects, for one or more SS bursts for the FT-NCR operation, the network entity 702 includes information in the MIB pointing to the CORESET-0 based on the MIB-to-CORESET-0 mapping of the unlicensed spectrum mapping. For example, the index for the CORESET-0 may be based on the indices for the unlicensed SIB-1.

In some aspects, the network entity 702 may transmit one or more other SSBs over the direct link (e.g., a Uu link with the UEs over the licensed frequency band) that include MIB with information pointing to the CORESET-0 based on the MIB-to-CORESET-0 mapping of the licensed spectrum mapping.

In some aspects, the system information carried in the PBCH of additional SS bursts, for the FT-NCR 706 operation, includes system information indicating for UE 704 not to use the SS burst if received over the licensed frequency band and licensed synchronization raster. In some aspects, the network entity 702 does not transmit the PDCCH and/or the associated SIB-1 in the CORESET-0 location based on the licensed MIB-to-CORESET-0 mapping.

In some aspects, the network entity 702 transmits a system information block (SIB) in the CORESET associated with the MIB based on the licensed MIB-to-CORESET-0 mapping indicating that the UE 704 is barred from using the CORESET. In some aspects, the network entity 702 sets a flag (e.g., a cellReservedForFutureUse flag) to prevent legacy UEs from attempting to decode PDCCH resources in the initial CORESET.

When the FT-NCR 706 receives the SS burst over the backhaul link on the licensed second frequency band $$(\text{e.g., } f_c^2),$$

the FWD 708 amplifies the SS burst transmission and translates the SS burst transmission to the third unlicensed frequency band $$(\text{e.g., } f_c^3)$$

for repeating the SS burst to the UE 704 over the access link at 716. In some aspects, the FT-NCR 706 translates the SS burst transmission to a synchronization raster associated with the unlicensed third frequency band. In some aspects, the synchronization raster is a non-legacy synchronization raster defined for the licensed-to-unlicensed FT-NCR operation. The non-legacy synchronization raster may be monitored for SS bursts only by non-legacy UEs.

Figure 8A:
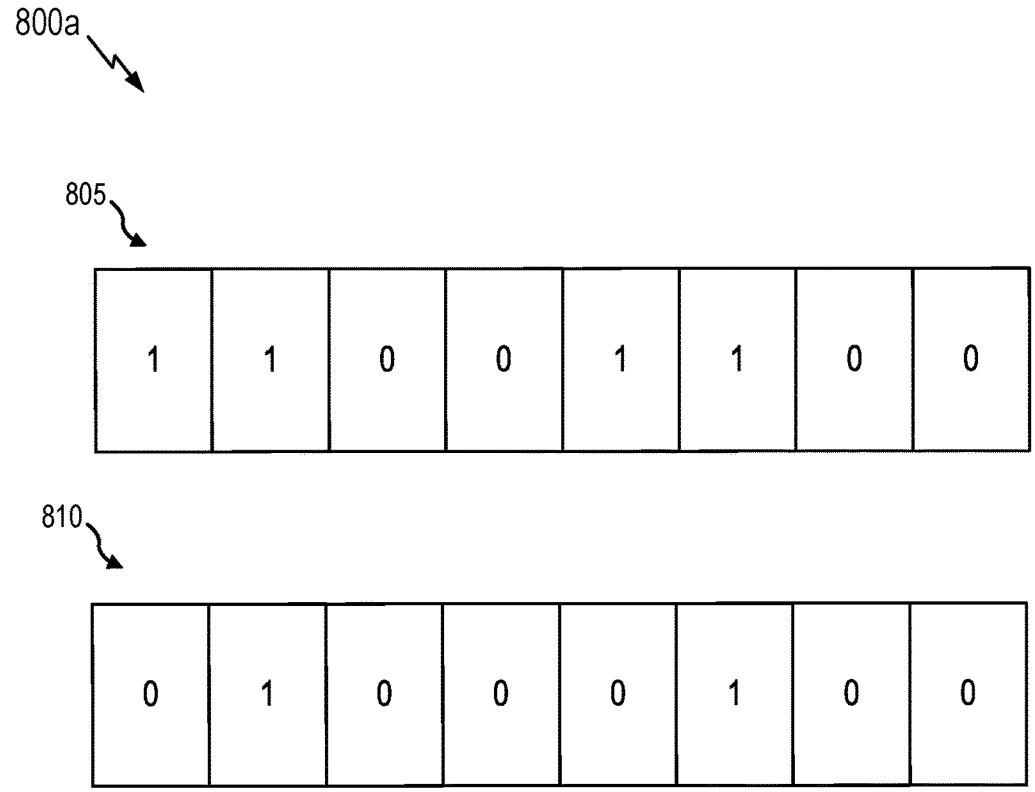
FIG. 8A illustrates an example FT-NCR synchronization signal block (SSB) burst location bitmap indicating FT-NCR SSB burst locations from a set of serving cell SSB burst locations.
Figure 8B:
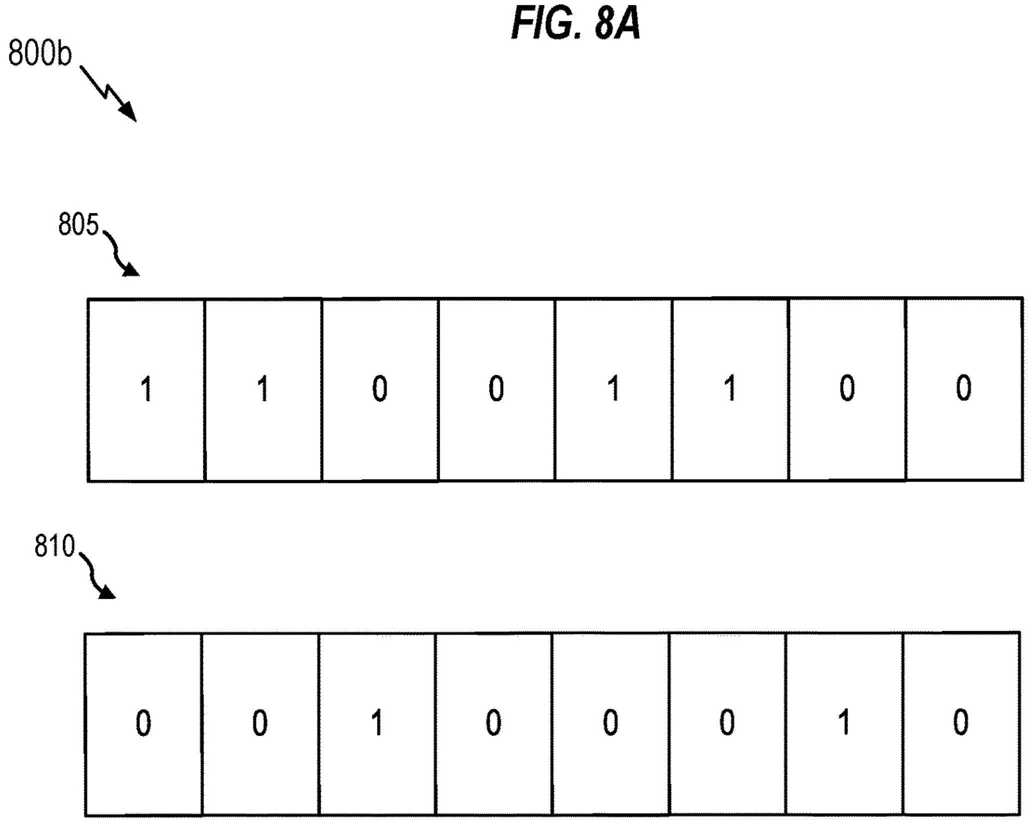
FIG. 8B illustrates an example FT-NCR SSB burst location bitmap indicating FT-NCR SSB burst locations additional to a set of serving cell SSB burst locations.

In some aspects, the FT-NCR 706 forwards the SS bursts in one or more SSB locations of SSB locations 810 of SSB locations 805 used by the network entity 702 as shown in FIG. 8A. In some aspects, the network entity 702 transmits separate SS burst locations 810 for the FT-NCR 706 operation additionally to the SSB locations 805 used by the network entity 702 as shown in FIG. 8B. In some aspects, the FT-NCR 706 forwards the SS bursts in one or more SSB additional SSB locations separate from SSB locations used by the network entity 702.

Once the UE 704 receives the SS burst with the MIB from the FT-NCR 706 over the access link on the third unlicensed frequency band, the UE 704 can determine the initial CORESET, at 718, and knows where to monitor for a PDCCH based on the MIB-to-CORESET-0 mapping associated with the unlicensed frequency band.

In some cases, where the UE 704 receives a MIB over the direct link from the network entity 702 in the licensed frequency band with the information indicating not to decode the associated CORESET-0, the UE 704 refrains from monitoring PDCCH in the CORESET-0 indicated by the MIB and the MIB-to-CORESET-0 mapping associated with the licensed frequency band. Alternatively, the UE 704 monitors in the CORESET-0 indicated by the MIB and the MIB-to-CORESET-0 mapping associated with the licensed frequency band and receives a SIB indicating not to decode the associated CORESET-0, the UE 704 refrains from monitoring PDCCH in the CORESET-0.

At 720, the network entity 702 transmits a PDCCH transmission in the CORESET indicated in the MIB. The PDCCH transmission includes DCI scheduling a PDSCH transmission carrying an initial SIB. The PDCCH transmissions may be sent via the Uu interface on the second frequency band $$(\text{e.g., } f_c^2)$$

with the first synchronization raster. As shown, the PDCCH transmission may not reach the UE 704, but the PDCCH transmission may be received by the FT-NCR 706 over the backhaul link. The FWD 708 amplifies the PDCCH transmission and translates the PDCCH transmission to the third unlicensed frequency band $$(\text{e.g., } f_c^3)$$

for repeating the PDCCH transmission to the UE 704 over the access link at 722.

At 724, the network entity 702 transmits the PDSCH transmission indicated in the DCI. As shown, the PDSCH transmission may not reach the UE 704, but the PDSCH transmission may be received by the FT-NCR 706 over the backhaul link. The FWD 708 amplifies the PDSCH transmission and translates the PDSCH transmission to the third unlicensed frequency band $$(\text{e.g., } f_c^3)$$

for repeating the PDSCH transmission to the UE 704 over the access link at 726. The PDSCH transmission may include an initial SIB (e.g., SIB1).

The initial SIB may carry information about SSBs. For example, the initial SIB may include a parameter (e.g., ssb-PositionInBurst in ServingCellConfigCommonSIB IE) that configures a time domain transmission pattern of SSBs by the serving cell. In some aspects, the initial SIB further includes a parameter (e.g., downlinkConfigCommonSIB) that configures a list of downlink frequency bands (e.g., frequencyInfoDL IE) and a parameter (e.g., uplinkConfigCommonSIB) that configures a list of uplink frequency bands (e.g., frequencyInfoUL IE). In some aspects, the initial SIB further includes a parameter (e.g., supplementaryUplink IE) that configures one or more supplement uplink SUL) frequency bands.

In some aspects, the initial SIB includes information for the UE 704 to use the access link for the FT-NCR operation. In some aspects, the initial SIB contains information for the UE 704 to perform RACH in response to SS bursts received over the access link frequency band. For example, the initial SIB may include first information for the UE 704 to perform RACH in response to SS bursts received over the direct link on the licensed frequency band and second information for the UE 704 to perform RACH in response to SS bursts received over the access link on the unlicensed frequency band. In some aspects, the initial SIB may indicate additional RACH resources to account for an LBT procedure for the unlicensed link. In some examples, the initial SIB may indicate a maximum RACH LBT failure threshold parameter for the access link. In some examples, the initial SIB may indicate for the UE 704 to refrain from power boosting on one or more RACH occasions. In some examples, the initial SIB may indicate for the UE 704 to refrain from performing LBT for RACH on the access link or for the UE to perform a short (e.g., Type2) LBT procedure for RACH on the access link. In some examples, the initial SIB may indicate a maximum transmit power for RACH on the access link. In some aspects, the initial SIB indicates an unlicensed frequency band for the UE 704 to use for uplink and/or downlink communication on the access link.

At 728, the UE 704 sends a RACH request, in response to the SS burst, to the serving cell (e.g., network entity 702) based on determining the SS burst, received from the FT-NCR 706, is associated with the same serving cell (e.g., network entity 702). For example, the UE 704 may send the RACH request to the network entity 702 via the FT-NCR 706. The RACH request may be received by the FT-NCR 706 over the access link. The FWD 708 amplifies the RACH request transmission and translates the RACH request transmission to the second frequency band $$(\text{e.g., } f_c^2)$$

for repeating the RACH request transmission to the network entity 702 over the backhaul link at 730. In some examples, if the UE 704 is unable to send a RACH request on the access link within the maximum RACH LBT failure threshold due to persistent LBT failures, the UE 704 may stop trying to transmit the RACH request for a fixed period.

If the initial SIB indicated an additional downlink only path, the UE 704 may use the access link to decode DCI and downlink traffic but the UE 704 does not perform RACH on the access link. If the initial SIB indicates an additional uplink only path, the UE 704 may conditionally use the access link to perform the RACH, for example, if RACH with the cell has failed, or if the cell signal quality (e.g., RSRP) is below a threshold. If the initial SIB indicates both an additional downlink path and an additional uplink path, the UE 704 may use the access link to decode DCI and downlink traffic and also use the access link to perform RACH.

Figure 9:
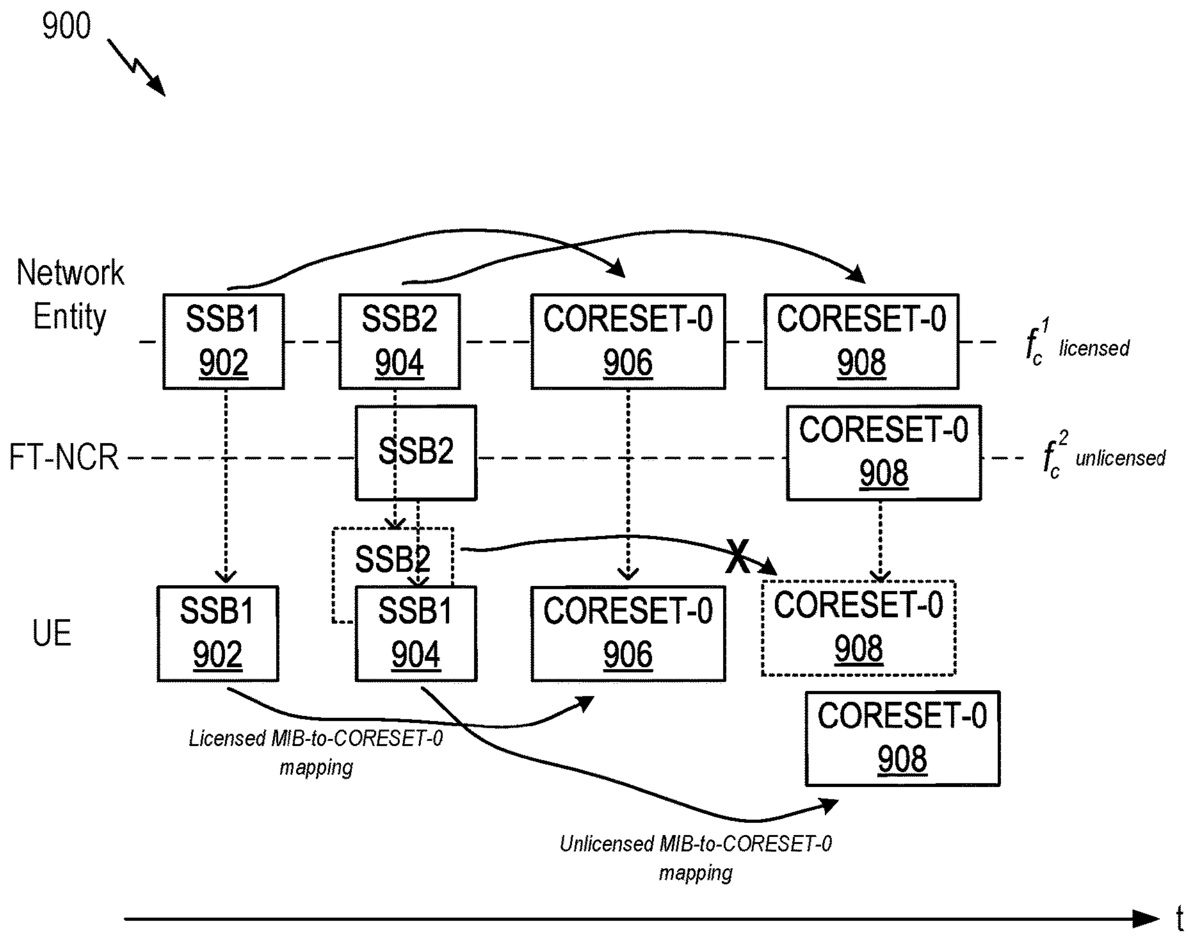
FIG. 9 illustrates example licensed-to-unlicensed FT-NCR operations.

FIG. 9 illustrates example licensed-to-unlicensed FT-NCR operations 900. As shown, the network entity transmits a first SS burst 902 over the licensed frequency band. The first SS burst 902 is received by the UE on the direct link over the licensed frequency band. The first SS burst 902 includes a MIB with system information based on the licensed frequency band MIB-to-CORESET-0 mapping. Accordingly, the UE can correctly determine the CORESET-0 906 to decode PDCCH based on the MIB and the licensed frequency band MIB-to-CORESET-0 mapping.

As shown, the network entity transmits a second SS burst 904 over the licensed frequency band. The second SS burst 904 includes a MIB with system information based on the unlicensed frequency band MIB-to-CORESET-0 mapping. If the second SS burst 904 is received by the UE on the direct link over the licensed frequency band, the UE will determine an invalid CORESET-0 908 to decode PDCCH based on the MIB and the licensed frequency band MIB-to-CORESET-0 mapping. However, if the second SS burst 904 is received by the UE on the access link over the unlicensed frequency band, the UE will determine the correct CORESET-0 908 to decode PDCCH based on the MIB and the unlicensed frequency band MIB-to-CORESET-0 mapping.

Example Operations

Figure 10:
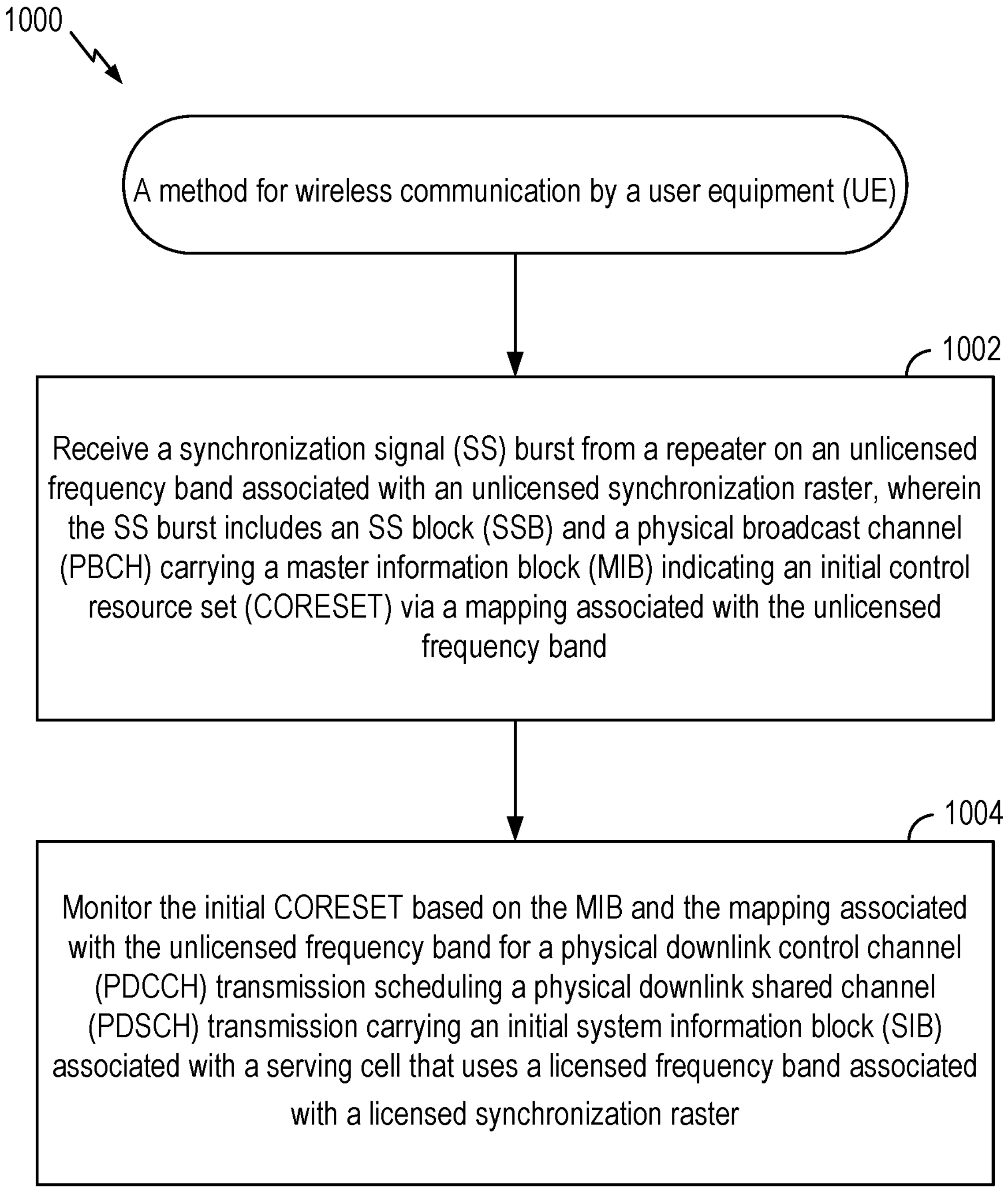
FIG. 10 depicts a method for wireless communications at a UE.

FIG. 10 shows an example of a method 1000 of wireless communication by a user equipment (UE), such as a UE 104 of FIGS. 1 and 3.

Method 1000 begins at step 1005 with receiving a synchronization signal (SS) burst from a repeater on an unlicensed frequency band associated with an unlicensed synchronization raster, wherein the SS burst includes an SS block (SSB) and a physical broadcast channel (PBCH) carrying a master information block (MIB) indicating an initial control resource set (CORESET) via a mapping associated with the unlicensed frequency band. In some cases, the operations of this step refer to, or may be performed by, circuitry for receiving and/or code for receiving as described with reference to FIG. 13.

Method 1000 then proceeds to step 1010 with monitoring the initial CORESET based on the MIB and the mapping associated with the unlicensed frequency band for a physical downlink control channel (PDCCH) transmission scheduling a physical downlink shared channel (PDSCH) transmission carrying an initial system information block (SIB) associated with a serving cell that uses a licensed frequency band associated with a licensed synchronization raster. In some cases, the operations of this step refer to, or may be performed by, circuitry for monitoring and/or code for monitoring as described with reference to FIG. 13.

In some aspects, the method 1000 further includes determining the SS burst is associated with the serving cell based on the unlicensed synchronization raster. In some cases, the operations of this step refer to, or may be performed by, circuitry for determining and/or code for determining as described with reference to FIG. 13.

In some aspects, the unlicensed frequency band and the unlicensed synchronization raster are associated with an access link between the UE and the repeater and the licensed frequency band and the licensed synchronization raster are associated with a direct link between the UE and the serving cell.

In some aspects, the method 1000 further includes receiving a SS burst from the serving cell on the licensed frequency band, wherein the SS burst includes an SSB and a PBCH carrying a MIB indicating an initial CORESET via a mapping associated with the unlicensed frequency band, wherein the SS burst includes an indication to refrain from decoding PDCCH resources in the initial CORESET if the SS burst is received on the licensed frequency band. In some cases, the operations of this step refer to, or may be performed by, circuitry for receiving and/or code for receiving as described with reference to FIG. 13.

In some aspects, the method 1000 further includes refraining from monitoring in the initial CORESET based on the indication and based on receiving the MIB in the licensed frequency band. In some cases, the operations of this step refer to, or may be performed by, circuitry for refraining and/or code for refraining as described with reference to FIG. 13.

In some aspects, the method 1000 further includes receiving a SS burst from the serving cell on the licensed frequency band, wherein the SS burst includes an SSB and a PBCH carrying a MIB indicating an initial CORESET via a mapping associated with the unlicensed frequency band. In some cases, the operations of this step refer to, or may be performed by, circuitry for receiving and/or code for receiving as described with reference to FIG. 13.

In some aspects, the method 1000 further includes receiving a SIB in the initial CORESET indicated in the MIB and the mapping associated with the licensed frequency band, wherein the SIB indicates the UE is barred from decoding PDCCH resources in the initial CORESET. In some cases, the operations of this step refer to, or may be performed by, circuitry for receiving and/or code for receiving as described with reference to FIG. 13.

In some aspects, the method 1000 further includes refraining from monitoring in the initial CORESET based on the indication. In some cases, the operations of this step refer to, or may be performed by, circuitry for refraining and/or code for refraining as described with reference to FIG. 13.

In some aspects, the initial SIB indicates a first random access channel (RACH) configuration associated with the licensed frequency band and with the licensed synchronization raster and a second RACH configuration associated with the unlicensed frequency band and with the unlicensed synchronization raster.

In some aspects, the first RACH configuration associated with the unlicensed synchronization raster includes a maximum RACH listen-before-talk (LBT) failure threshold parameter.

In some aspects, the method 1000 further includes determining to send a RACH request message for the serving cell via the unlicensed frequency band. In some cases, the operations of this step refer to, or may be performed by, circuitry for determining and/or code for determining as described with reference to FIG. 13.

In some aspects, the method 1000 further includes performing an LBT procedure in response to the determination to send the RACH request message. In some cases, the operations of this step refer to, or may be performed by, circuitry for performing and/or code for performing as described with reference to FIG. 13.

In some aspects, the method 1000 further includes refraining from sending the RACH request message in response to a number of LBT failures reaching the maximum RACH LBT failure threshold. In some cases, the operations of this step refer to, or may be performed by, circuitry for refraining and/or code for refraining as described with reference to FIG. 13.

In some aspects, the first RACH configuration associated with the unlicensed synchronization raster includes an indication to refrain from performing power boosting when sending a RACH request message for the serving cell via the unlicensed frequency band.

In some aspects, the first RACH configuration associated with the unlicensed synchronization raster includes an indication to skip performing a listen-before-talk (LBT) procedure when sending a RACH request message for the serving cell via the unlicensed frequency band.

In some aspects, the first RACH configuration associated with the unlicensed synchronization raster includes an indication to perform a short listen-before-talk (LBT) procedure when sending a RACH request message for the serving cell via the unlicensed frequency band.

In some aspects, the first RACH configuration associated with the unlicensed synchronization raster includes a maximum transmit power for sending a RACH request message for the serving cell via the unlicensed frequency band.

In some aspects, the first RACH configuration associated with the unlicensed synchronization raster includes a maximum number of repetitions for sending a RACH request message for the serving cell via the unlicensed frequency band.

In some aspects, the initial SIB indicates for the UE to use the unlicensed frequency band only for uplink transmission to the serving cell.

In some aspects, the initial SIB indicates for the UE to use the unlicensed frequency band only for downlink reception from the serving cell.

In some aspects, the initial SIB indicates for the UE to use the unlicensed frequency band for both uplink transmission to the serving cell and downlink reception from the serving cell.

Figure 13:
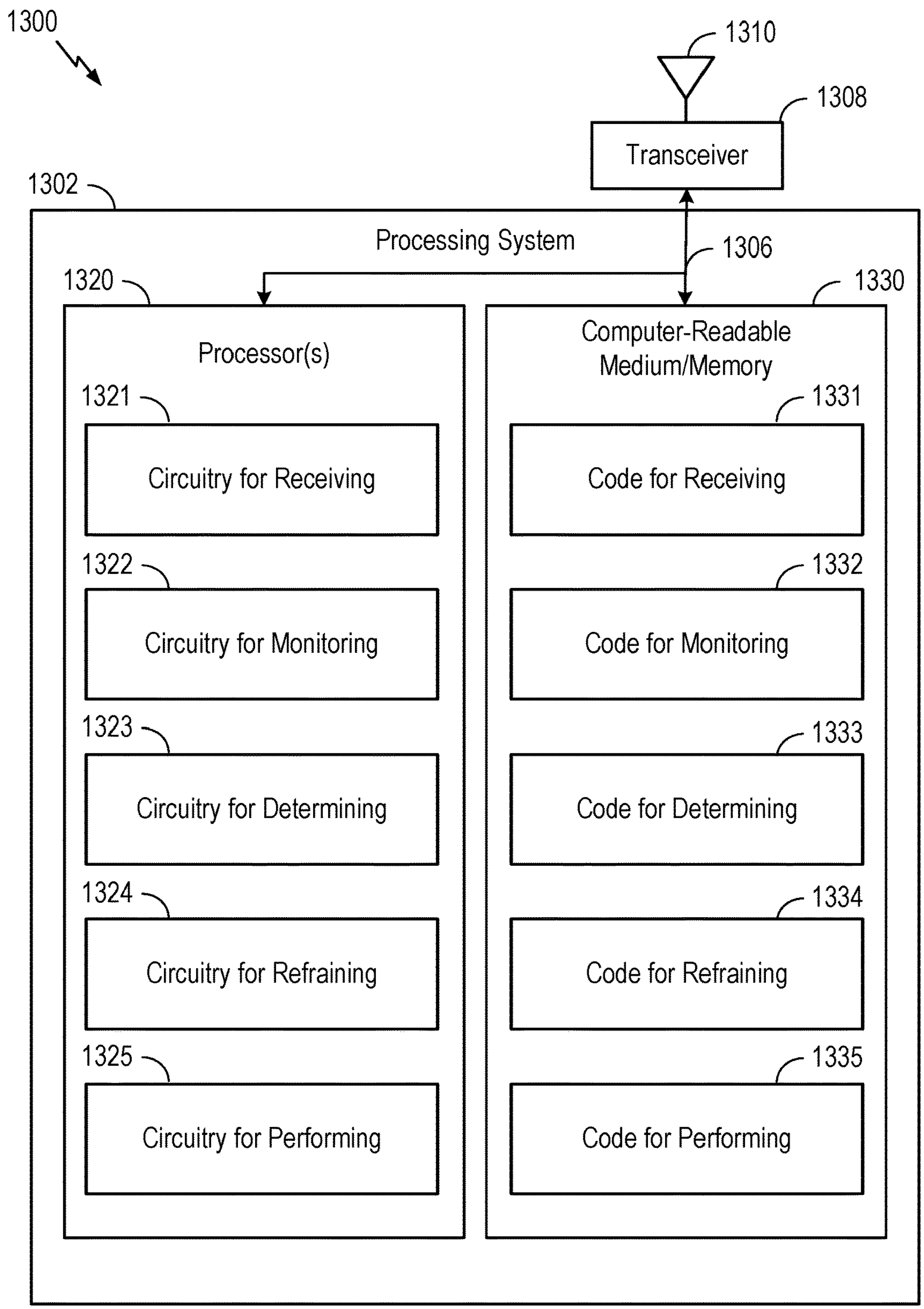
FIG. 13 depicts aspects of an example communications device.

In one aspect, method 1000, or any aspect related to it, may be performed by an apparatus, such as communications device 1300 of FIG. 13, which includes various components operable, configured, or adapted to perform the method 1000. Communications device 1300 is described below in further detail.

Note that FIG. 10 is just one example of a method, and other methods including fewer, additional, or alternative steps are possible consistent with this disclosure.

Figure 11:
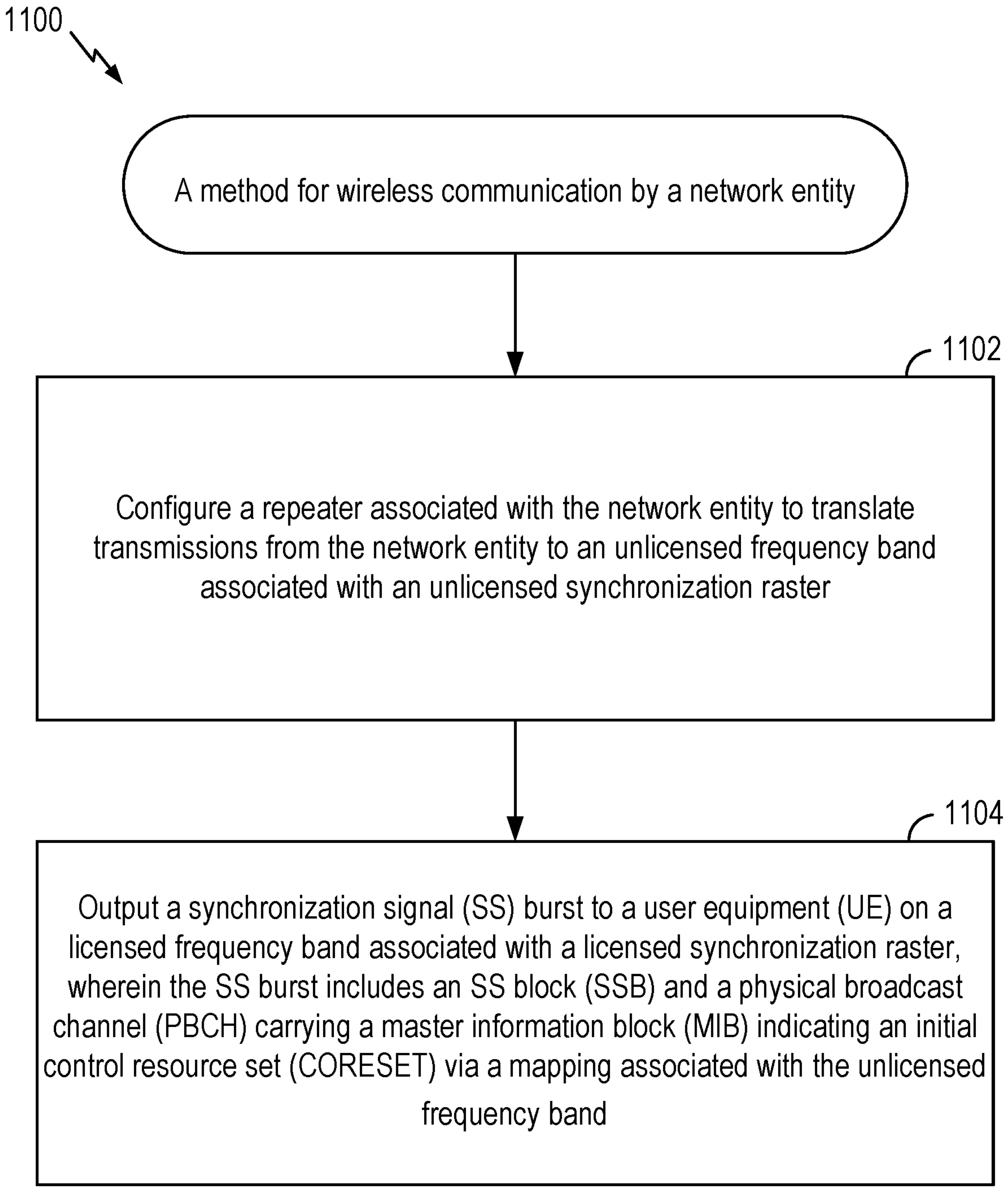
FIG. 11 depicts a method for wireless communications at a network entity.

FIG. 11 shows an example of a method 1100 of wireless communication by a network entity, such as a BS 102 of FIGS. 1 and 3, or a disaggregated base station as discussed with respect to FIG. 2.

Method 1100 begins at step 1105 with configuring a repeater associated with the network entity to translate transmissions from the network entity to an unlicensed frequency band associated with an unlicensed synchronization raster. In some cases, the operations of this step refer to, or may be performed by, circuitry for configuring and/or code for configuring as described with reference to FIG. 14.

Method 1100 then proceeds to step 1110 with outputting a synchronization signal (SS) burst to a user equipment (UE) on a licensed frequency band associated with a licensed synchronization raster, wherein the SS burst includes an SS block (SSB) and a physical broadcast channel (PBCH) carrying a master information block (MIB) indicating an initial control resource set (CORESET) via a mapping associated with the unlicensed frequency band. In some cases, the operations of this step refer to, or may be performed by, circuitry for outputting and/or code for outputting as described with reference to FIG. 14.

In some aspects, the unlicensed frequency band and the unlicensed synchronization raster are associated with an access link between the UE and the repeater and the licensed frequency band and the licensed synchronization raster are associated with a direct link between the UE and a serving cell.

In some aspects, the method 1100 further includes outputting, on the initial CORESET based on the MIB and the mapping associated with the unlicensed frequency band and with the unlicensed synchronization raster, a physical downlink control channel (PDCCH) transmission scheduling a physical downlink shared channel (PDSCH) transmission carrying an initial system information block (SIB). In some cases, the operations of this step refer to, or may be performed by, circuitry for outputting and/or code for outputting as described with reference to FIG. 14.

In some aspects, the SS burst includes an indication to refrain from decoding PDCCH resources in the initial CORESET if the SS burst is received on the licensed frequency band.

In some aspects, the method 1100 further includes refraining from outputting in an initial CORESET indicated by the MIB via a mapping associated with the licensed frequency band. In some cases, the operations of this step refer to, or may be performed by, circuitry for refraining and/or code for refraining as described with reference to FIG. 14.

In some aspects, the method 1100 further includes outputting a SIB in an initial CORESET indicated by the MIB via a mapping associated with the licensed frequency band, wherein the SIB indicates the UE is barred from decoding PDCCH resources in the initial CORESET. In some cases, the operations of this step refer to, or may be performed by, circuitry for outputting and/or code for outputting as described with reference to FIG. 14.

In some aspects, the initial SIB indicates a first random access channel (RACH) configuration associated with the licensed frequency band and with the licensed synchronization raster and a second RACH configuration associated with the unlicensed frequency band and with the unlicensed synchronization raster.

In some aspects, the first RACH configuration associated with the unlicensed synchronization raster includes a maximum RACH listen-before-talk (LBT) failure threshold parameter.

In some aspects, the first RACH configuration associated with the unlicensed synchronization raster includes an indication to refrain from performing power boosting when sending a RACH request message for a serving cell via the unlicensed frequency band.

In some aspects, the first RACH configuration associated with the unlicensed synchronization raster includes an indication to skip performing a listen-before-talk (LBT) procedure when sending a RACH request message for a serving cell via the unlicensed frequency band.

In some aspects, the first RACH configuration associated with the unlicensed synchronization raster includes an indication to perform a short listen-before-talk (LBT) procedure when sending a RACH request message for a serving cell via the unlicensed frequency band.

In some aspects, the first RACH configuration associated with the unlicensed synchronization raster includes a maximum transmit power for sending a RACH request message for a serving cell via the unlicensed frequency band.

In some aspects, the first RACH configuration associated with the unlicensed synchronization raster includes a maximum number of repetitions for sending a RACH request message for a serving cell via the unlicensed frequency band.

In some aspects, the initial SIB indicates for the UE to use the unlicensed frequency band only for uplink transmission to a serving cell.

In some aspects, the initial SIB indicates for the UE to use the unlicensed frequency band only for downlink reception from a serving cell.

In some aspects, the initial SIB indicates for the UE to use the unlicensed frequency band for both uplink transmission to a serving cell and downlink reception from a serving cell.

Figure 14:
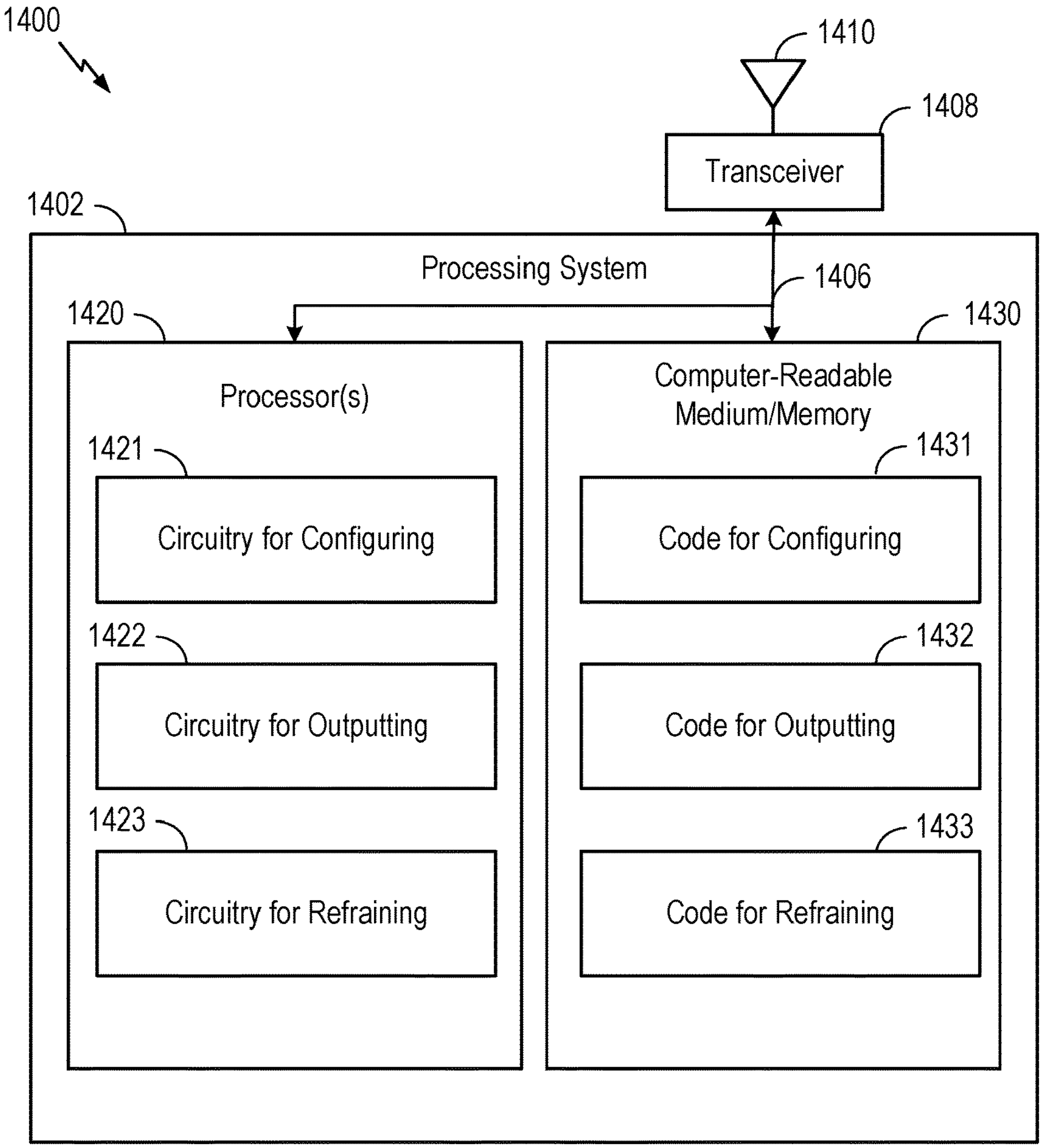
FIG. 14 depicts aspects of an example communications device.

In one aspect, method 1100, or any aspect related to it, may be performed by an apparatus, such as communications device 1400 of FIG. 14, which includes various components operable, configured, or adapted to perform the method 1100. Communications device 1400 is described below in further detail.

Note that FIG. 11 is just one example of a method, and other methods including fewer, additional, or alternative steps are possible consistent with this disclosure.

Figure 12:
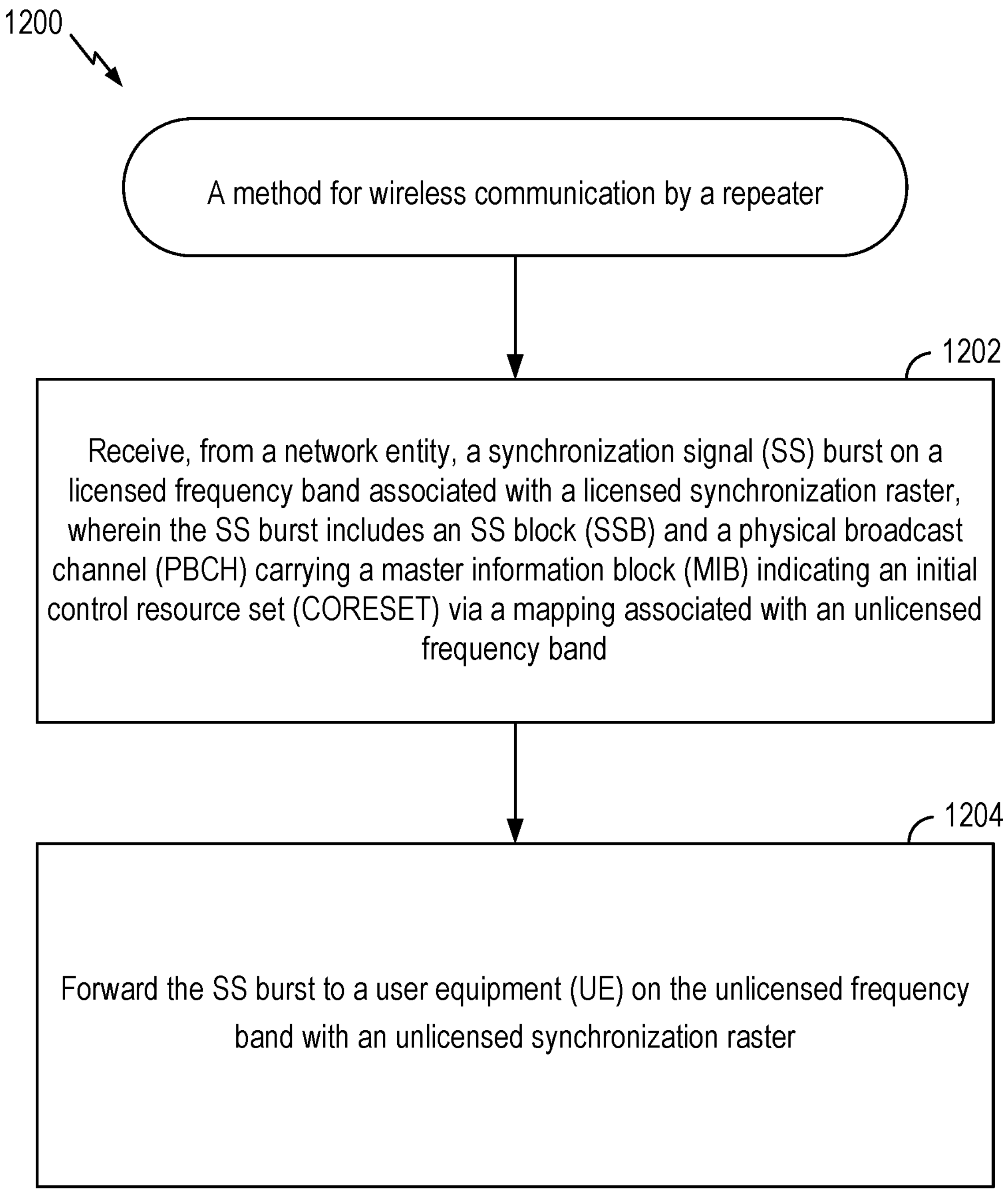
FIG. 12 depicts a method for wireless communications at an FT-NCR.

FIG. 12 shows an example of a method 1200 of wireless communication by a repeater. In some examples, the repeater is a user equipment, such as a UE 104 of FIGS. 1 and 3. In some examples, the repeater is a network entity, such as a BS 102 of FIGS. 1 and 3, or a disaggregated base station as discussed with respect to FIG. 2.

Method 1200 begins at step 1205 with receiving, from a network entity, a synchronization signal (SS) burst on a licensed frequency band associated with a licensed synchronization raster, wherein the SS burst includes an SS block (SSB) and a physical broadcast channel (PBCH) carrying a master information block (MIB) indicating an initial control resource set (CORESET) via a mapping associated with an unlicensed frequency band. In some cases, the operations of this step refer to, or may be performed by, circuitry for receiving and/or code for receiving as described with reference to FIG. 15.

Method 1200 then proceeds to step 1210 with forwarding the SS burst to a user equipment (UE) on the unlicensed frequency band with an unlicensed synchronization raster. In some cases, the operations of this step refer to, or may be performed by, circuitry for forwarding and/or code for forwarding as described with reference to FIG. 15.

In some aspects, the unlicensed frequency band and the unlicensed synchronization raster are associated with an access link between the UE and the repeater and the licensed frequency band and the licensed synchronization raster are associated with a direct link between the UE and the network entity.

In some aspects, the initial SIB indicates a first random access channel (RACH) configuration associated with the licensed frequency band and with the licensed synchronization raster and a second RACH configuration associated with the unlicensed frequency band and with the unlicensed synchronization raster.

In some aspects, the first RACH configuration associated with the unlicensed synchronization raster includes a maximum RACH listen-before-talk (LBT) failure threshold parameter.

In some aspects, the first RACH configuration associated with the unlicensed synchronization raster includes an indication to refrain from performing power boosting when sending a RACH request message for a serving cell via the unlicensed frequency band.

In some aspects, the first RACH configuration associated with the unlicensed synchronization raster includes an indication to skip performing a listen-before-talk (LBT) procedure when sending a RACH request message for a serving cell via the unlicensed frequency band.

In some aspects, the first RACH configuration associated with the unlicensed synchronization raster includes an indication to perform a short listen-before-talk (LBT) procedure when sending a RACH request message for a serving cell via the unlicensed frequency band.

In some aspects, the first RACH configuration associated with the unlicensed synchronization raster includes a maximum transmit power for sending a RACH request message for a serving cell via the unlicensed frequency band.

In some aspects, the first RACH configuration associated with the unlicensed synchronization raster includes a maximum number of repetitions for sending a RACH request message for a serving cell via the unlicensed frequency band.

In some aspects, the initial SIB indicates for the UE to use the unlicensed frequency band only for uplink transmission to a serving cell.

In some aspects, the initial SIB indicates for the UE to use the unlicensed frequency band only for downlink reception from a serving cell.

In some aspects, the initial SIB indicates for the UE to use the unlicensed frequency band for both uplink transmission to a serving cell and downlink reception from a serving cell.

In some aspects, the method 1200 further includes receiving control information configuring the repeater to translate transmissions from the network entity on the licensed frequency to the unlicensed frequency band and to forward the translated transmissions to the UE. In some cases, the operations of this step refer to, or may be performed by, circuitry for receiving and/or code for receiving as described with reference to FIG. 15.

In some aspects, the control information is received from the network entity over a control link.

Figure 15:
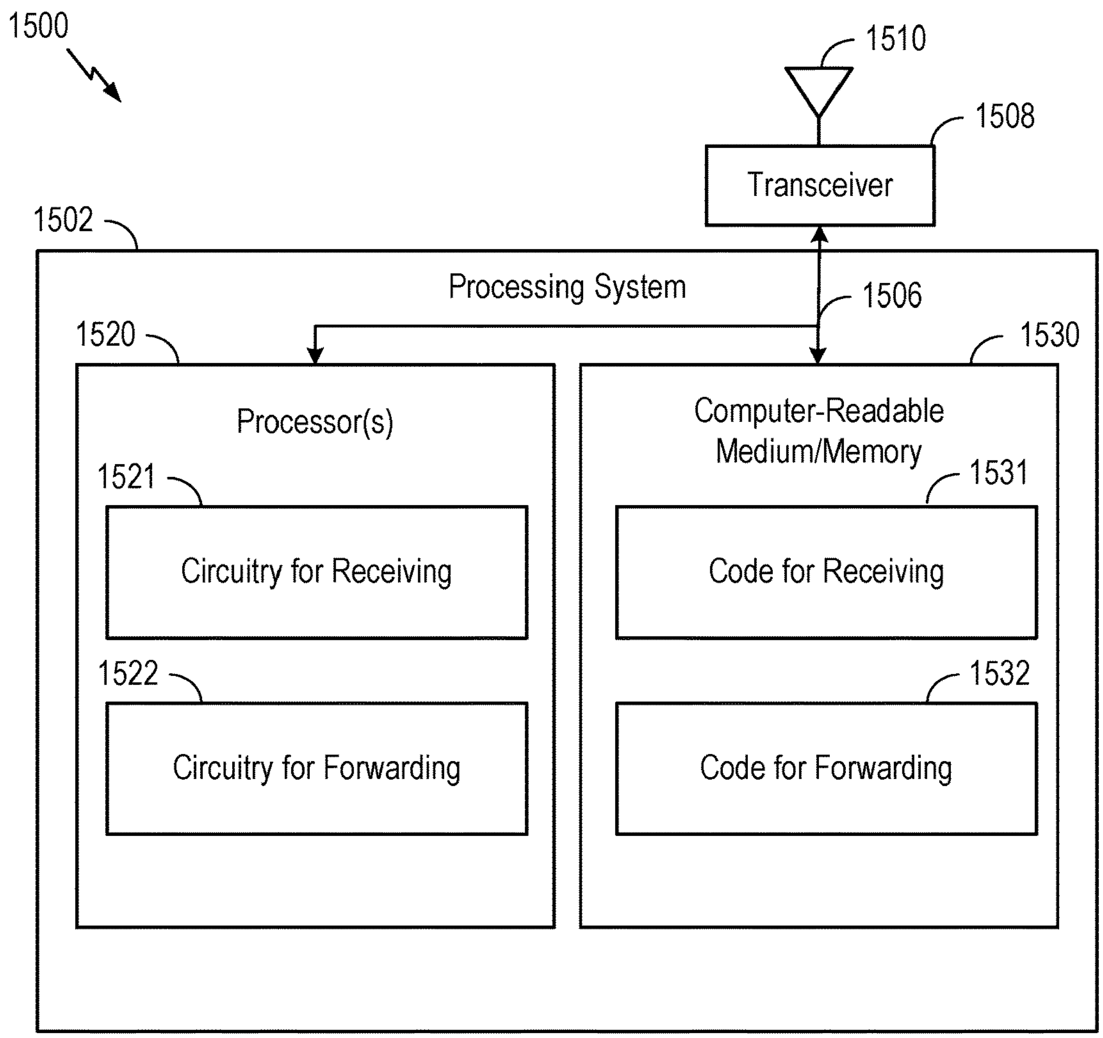
FIG. 15 depicts aspects of an example communications device.

In one aspect, method 1200, or any aspect related to it, may be performed by an apparatus, such as communications device 1500 of FIG. 15, which includes various components operable, configured, or adapted to perform the method 1200. Communications device 1500 is described below in further detail.

Note that FIG. 12 is just one example of a method, and other methods including fewer, additional, or alternative steps are possible consistent with this disclosure.

Example Communications Device(s)

FIG. 13 depicts aspects of an example communications device 1300. In some aspects, communications device 1300 is a user equipment, such as UE 104 described above with respect to FIGS. 1 and 3.

The communications device 1300 includes a processing system 1305 coupled to the transceiver 1375 (e.g., a transmitter and/or a receiver). The transceiver 1375 is configured to transmit and receive signals for the communications device 1300 via the antenna 1380, such as the various signals as described herein. The processing system 1305 may be configured to perform processing functions for the communications device 1300, including processing signals received and/or to be transmitted by the communications device 1300.

The processing system 1305 includes one or more processors 1310. In various aspects, the one or more processors 1310 may be representative of one or more of receive processor 358, transmit processor 364, TX MIMO processor 366, and/or controller/processor 380, as described with respect to FIG. 3. The one or more processors 1310 are coupled to a computer-readable medium/memory 1340 via a bus 1370. In certain aspects, the computer-readable medium/memory 1340 is configured to store instructions (e.g., computer-executable code) that when executed by the one or more processors 1310, cause the one or more processors 1310 to perform the method 1000 described with respect to FIG. 10, or any aspect related to it. Note that reference to a processor performing a function of communications device 1300 may include one or more processors 1310 performing that function of communications device 1300.

In the depicted example, computer-readable medium/memory 1340 stores code (e.g., executable instructions), such as code for receiving 1345, code for monitoring 1350, code for determining 1355, code for refraining 1360, and code for performing 1365. Processing of the code for receiving 1345, code for monitoring 1350, code for determining 1355, code for refraining 1360, and code for performing 1365 may cause the communications device 1300 to perform the method 1000 described with respect to FIG. 10, or any aspect related to it.

The one or more processors 1310 include circuitry configured to implement (e.g., execute) the code stored in the computer-readable medium/memory 1340, including circuitry such as circuitry for receiving 1315, circuitry for monitoring 1320, circuitry for determining 1325, circuitry for refraining 1330, and circuitry for performing 1335. Processing with circuitry for receiving 1315, circuitry for monitoring 1320, circuitry for determining 1325, circuitry for refraining 1330, and circuitry for performing 1335 may cause the communications device 1300 to perform the method 1000 described with respect to FIG. 10, or any aspect related to it.

Various components of the communications device 1300 may provide means for performing the method 1000 described with respect to FIG. 10, or any aspect related to it. For example, means for transmitting, sending or outputting for transmission may include transceivers 354 and/or antenna(s) 352 of the UE 104 illustrated in FIG. 3 and/or the transceiver 1375 and the antenna 1380 of the communications device 1300 in FIG. 13. Means for receiving or obtaining may include transceivers 354 and/or antenna(s) 352 of the UE 104 illustrated in FIG. 3 and/or the transceiver 1375 and the antenna 1380 of the communications device 1300 in FIG. 13.

FIG. 14 depicts aspects of an example communications device 1400. In some aspects, communications device 1400 is a network entity, such as BS 102 of FIGS. 1 and 3, or a disaggregated base station as discussed with respect to FIG. 2.

The communications device 1400 includes a processing system 1405 coupled to the transceiver 1455 (e.g., a transmitter and/or a receiver) and/or a network interface 1465. The transceiver 1455 is configured to transmit and receive signals for the communications device 1400 via the antenna 1460, such as the various signals as described herein. The network interface 1465 is configured to obtain and send signals for the communications device 1400 via communication link(s), such as a backhaul link, midhaul link, and/or fronthaul link as described herein, such as with respect to FIG. 2. The processing system 1405 may be configured to perform processing functions for the communications device 1400, including processing signals received and/or to be transmitted by the communications device 1400.

The processing system 1405 includes one or more processors 1410. In various aspects, one or more processors 1410 may be representative of one or more of receive processor 338, transmit processor 320, TX MIMO processor 330, and/or controller/processor 340, as described with respect to FIG. 3. The one or more processors 1410 are coupled to a computer-readable medium/memory 1430 via a bus 1450. In certain aspects, the computer-readable medium/memory 1430 is configured to store instructions (e.g., computer-executable code) that when executed by the one or more processors 1410, cause the one or more processors 1410 to perform the method 1100 described with respect to FIG. 11, or any aspect related to it. Note that reference to a processor of communications device 1400 performing a function may include one or more processors 1410 of communications device 1400 performing that function.

In the depicted example, the computer-readable medium/memory 1430 stores code (e.g., executable instructions), such as code for configuring 1435, code for outputting 1440, and code for refraining 1445. Processing of the code for configuring 1435, code for outputting 1440, and code for refraining 1445 may cause the communications device 1400 to perform the method 1100 described with respect to FIG. 11, or any aspect related to it.

The one or more processors 1410 include circuitry configured to implement (e.g., execute) the code stored in the computer-readable medium/memory 1430, including circuitry such as circuitry for configuring 1415, circuitry for outputting 1420, and circuitry for refraining 1425. Processing with circuitry for configuring 1415, circuitry for outputting 1420, and circuitry for refraining 1425 may cause the communications device 1400 to perform the method 1100 described with respect to FIG. 11, or any aspect related to it.

Various components of the communications device 1400 may provide means for performing the method 1100 described with respect to FIG. 11, or any aspect related to it. Means for transmitting, sending or outputting for transmission may include transceivers 332 and/or antenna(s) 334 of the BS 102 illustrated in FIG. 3 and/or the transceiver 1455 and the antenna 1460 of the communications device 1400 in FIG. 14. Means for receiving or obtaining may include transceivers 332 and/or antenna(s) 334 of the BS 102 illustrated in FIG. 3 and/or the transceiver 1455 and the antenna 1460 of the communications device 1400 in FIG. 14.

FIG. 15 depicts aspects of an example communications device 1500. In some aspects, communications device 1500 is a user equipment, such as UE 104 described above with respect to FIGS. 1 and 3. In some aspects, communications device 1500 is a network entity, such as BS 102 of FIGS. 1 and 3, or a disaggregated base station as discussed with respect to FIG. 2.

The communications device 1500 includes a processing system 1505 coupled to the transceiver 1545 (e.g., a transmitter and/or a receiver). In some aspects (e.g., when communications device 1500 is a network entity), processing system 1505 may be coupled to a network interface 1555 that is configured to obtain and send signals for the communications device 1500 via communication link(s), such as a backhaul link, midhaul link, and/or fronthaul link as described herein, such as with respect to FIG. 2. The transceiver 1545 is configured to transmit and receive signals for the communications device 1500 via the antenna 1550, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1525 via a bus 1540. In certain aspects, the computer-readable medium/memory 1525 is configured to store instructions (e.g., computer-executable code) that when executed by the one or more processors 1510, cause the one or more processors 1510 to perform the method 1200 described with respect to FIG. 12, or any aspect related to it. Note that reference to a processor performing a function of communications device 1500 may include one or more processors 1510 performing that function of communications device 1500.

In the depicted example, computer-readable medium/memory 1525 stores code (e.g., executable instructions), such as code for receiving 1530 and code for forwarding 1535. Processing of the code for receiving 1530 and code for forwarding 1535 may cause the communications device 1500 to perform the method 1200 described with respect to FIG. 12, or any aspect related to it.

The one or more processors 1510 include circuitry configured to implement (e.g., execute) the code stored in the computer-readable medium/memory 1525, including circuitry for receiving 1515 and circuitry for forwarding 1520. Processing with circuitry for receiving 1515 and circuitry for forwarding 1520 may cause the communications device 1500 to perform the method 1200 described with respect to FIG. 12, or any aspect related to it.

Various components of the communications device 1500 may provide means for performing the method 1200 described with respect to FIG. 12, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1545 and the antenna 1550 of the communications device 1500 in FIG. 15. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1545 and the antenna 1550 of the communications device 1500 in FIG. 15.

Example Clauses

Implementation examples are described in the following numbered clauses:

Clause 1: A method for wireless communication by a user equipment (UE), comprising: receiving a synchronization signal (SS) burst from a repeater on an unlicensed frequency band associated with an unlicensed synchronization raster, wherein the SS burst includes an SS block (SSB) and a physical broadcast channel (PBCH) carrying a master information block (MIB) indicating an initial control resource set (CORESET) via a mapping associated with the unlicensed frequency band; and monitoring the initial CORESET based on the MIB and the mapping associated with the unlicensed frequency band for a physical downlink control channel (PDCCH) transmission scheduling a physical downlink shared channel (PDSCH) transmission carrying an initial system information block (SIB) associated with a serving cell that uses a licensed frequency band associated with a licensed synchronization raster.

Clause 2: The method of Clause 1, further comprising determining the SS burst is associated with the serving cell based on the unlicensed synchronization raster.

Clause 3: The method of combination one of Clauses 1-2, wherein the unlicensed frequency band and the unlicensed synchronization raster are associated with an access link between the UE and the repeater and the licensed frequency band and the licensed synchronization raster are associated with a direct link between the UE and the serving cell.

Clause 4: The method of any combination of Clauses 1-3, further comprising: receiving a SS burst from the serving cell on the licensed frequency band, wherein the SS burst includes an SSB and a PBCH carrying a MIB indicating an initial CORESET via a mapping associated with the unlicensed frequency band, wherein the SS burst includes an indication to refrain from decoding PDCCH resources in the initial CORESET if the SS burst is received on the licensed frequency band; and refraining from monitoring in the initial CORESET based on the indication and based on receiving the MIB in the licensed frequency band.

Clause 5: The method of any combination of Clauses 1-4, further comprising: receiving a SS burst from the serving cell on the licensed frequency band, wherein the SS burst includes an SSB and a PBCH carrying a MIB indicating an initial CORESET via a mapping associated with the unlicensed frequency band; receiving a SIB in the initial CORESET indicated in the MIB and the mapping associated with the licensed frequency band, wherein the SIB indicates the UE is barred from decoding PDCCH resources in the initial CORESET; and refraining from monitoring in the initial CORESET based on the indication.

Clause 6: The method of any combination of Clauses 1-5, wherein the initial SIB indicates a first random access channel (RACH) configuration associated with the licensed frequency band and with the licensed synchronization raster and a second RACH configuration associated with the unlicensed frequency band and with the unlicensed synchronization raster.

Clause 7: The method of Clause 6, wherein the first RACH configuration associated with the unlicensed synchronization raster includes a maximum RACH listen-before-talk (LBT) failure threshold parameter.

Clause 8: The method of Clause 7, further comprising: determining to send a RACH request message for the serving cell via the unlicensed frequency band; performing an LBT procedure in response to the determination to send the RACH request message; and refraining from sending the RACH request message in response to a number of LBT failures reaching the maximum RACH LBT failure threshold.

Clause 9: The method of any combination of Clauses 6-7, wherein the first RACH configuration associated with the unlicensed synchronization raster includes an indication to refrain from performing power boosting when sending a RACH request message for the serving cell via the unlicensed frequency band.

Clause 10: The method of any combination of Clauses 6-9, wherein the first RACH configuration associated with the unlicensed synchronization raster includes an indication to skip performing a listen-before-talk (LBT) procedure when sending a RACH request message for the serving cell via the unlicensed frequency band.

Clause 11: The method of any combination of Clauses 6-10, wherein the first RACH configuration associated with the unlicensed synchronization raster includes an indication to perform a short listen-before-talk (LBT) procedure when sending a RACH request message for the serving cell via the unlicensed frequency band.

Clause 12: The method of any combination of Clauses 6-11, wherein the first RACH configuration associated with the unlicensed synchronization raster includes a maximum transmit power for sending a RACH request message for the serving cell via the unlicensed frequency band.

Clause 13: The method of any combination of Clauses 6-12, wherein the first RACH configuration associated with the unlicensed synchronization raster includes a maximum number of repetitions for sending a RACH request message for the serving cell via the unlicensed frequency band.

Clause 14: The method of any combination of Clauses 6-13, wherein the initial SIB indicates for the UE to use the unlicensed frequency band only for uplink transmission to the serving cell.

Clause 15: The method of any combination of Clauses 6-14, wherein the initial SIB indicates for the UE to use the unlicensed frequency band only for downlink reception from the serving cell.

Clause 16: The method of any combination of Clauses 6-15, wherein the initial SIB indicates for the UE to use the unlicensed frequency band for both uplink transmission to the serving cell and downlink reception from the serving cell.

Clause 17: A method for wireless communication by a network entity, comprising: configuring a repeater associated with the network entity to translate transmissions from the network entity to an unlicensed frequency band associated with an unlicensed synchronization raster; and outputting a synchronization signal (SS) burst to a user equipment (UE) on a licensed frequency band associated with a licensed synchronization raster, wherein the SS burst includes an SS block (SSB) and a physical broadcast channel (PBCH) carrying a master information block (MIB) indicating an initial control resource set (CORESET) via a mapping associated with the unlicensed frequency band.

Clause 18: The method of Clause 17, wherein the unlicensed frequency band and the unlicensed synchronization raster are associated with an access link between the UE and the repeater and the licensed frequency band and the licensed synchronization raster are associated with a direct link between the UE and a serving cell.

Clause 19: The method of any combination of Clauses 17-18, further comprising outputting, on the initial CORESET based on the MIB and the mapping associated with the unlicensed frequency band and with the unlicensed synchronization raster, a physical downlink control channel (PDCCH) transmission scheduling a physical downlink shared channel (PDSCH) transmission carrying an initial system information block (SIB).

Clause 20: The method of any combination of Clauses 17-19, wherein the SS burst includes an indication to refrain from decoding PDCCH resources in the initial CORESET if the SS burst is received on the licensed frequency band.

Clause 21: The method of any combination of Clauses 17-20, further comprising refraining from outputting in an initial CORESET indicated by the MIB via a mapping associated with the licensed frequency band.

Clause 22: The method of any combination of Clauses 17-21, further comprising outputting a SIB in an initial CORESET indicated by the MIB via a mapping associated with the licensed frequency band, wherein the SIB indicates the UE is barred from decoding PDCCH resources in the initial CORESET.

Clause 23: The method of any combination of Clauses 17-22, wherein the initial SIB indicates a first random access channel (RACH) configuration associated with the licensed frequency band and with the licensed synchronization raster and a second RACH configuration associated with the unlicensed frequency band and with the unlicensed synchronization raster.

Clause 24: The method of Clause 23, wherein the first RACH configuration associated with the unlicensed synchronization raster includes a maximum RACH listen-before-talk (LBT) failure threshold parameter.

Clause 25: The method of any combination of Clauses 23-24, wherein the first RACH configuration associated with the unlicensed synchronization raster includes an indication to refrain from performing power boosting when sending a RACH request message for a serving cell via the unlicensed frequency band.

Clause 26: The method of any combination of Clauses 23-25, wherein the first RACH configuration associated with the unlicensed synchronization raster includes an indication to skip performing a listen-before-talk (LBT) procedure when sending a RACH request message for a serving cell via the unlicensed frequency band.

Clause 27: The method of any combination of Clauses 23-26, wherein the first RACH configuration associated with the unlicensed synchronization raster includes an indication to perform a short listen-before-talk (LBT) procedure when sending a RACH request message for a serving cell via the unlicensed frequency band.

Clause 28: The method of any combination of Clauses 23-27, wherein the first RACH configuration associated with the unlicensed synchronization raster includes a maximum transmit power for sending a RACH request message for a serving cell via the unlicensed frequency band.

Clause 29: The method of any combination of Clauses 23-28, wherein the first RACH configuration associated with the unlicensed synchronization raster includes a maximum number of repetitions for sending a RACH request message for a serving cell via the unlicensed frequency band.

Clause 30: The method of any combination of Clauses 23-29, wherein the initial SIB indicates for the UE to use the unlicensed frequency band only for uplink transmission to a serving cell.

Clause 31: The method of any combination of Clauses 23-30, wherein the initial SIB indicates for the UE to use the unlicensed frequency band only for downlink reception from a serving cell.

Clause 32: The method of any combination of Clauses 23-31, wherein the initial SIB indicates for the UE to use the unlicensed frequency band for both uplink transmission to a serving cell and downlink reception from a serving cell.

Clause 33: A method for wireless communication by a repeater, comprising: receiving, from a network entity, a synchronization signal (SS) burst on a licensed frequency band associated with a licensed synchronization raster, wherein the SS burst includes an SS block (SSB) and a physical broadcast channel (PBCH) carrying a master information block (MIB) indicating an initial control resource set (CORESET) via a mapping associated with an unlicensed frequency band; and forwarding the SS burst to a user equipment (UE) on the unlicensed frequency band with an unlicensed synchronization raster.

Clause 34: The method of Clause 33, wherein the unlicensed frequency band and the unlicensed synchronization raster are associated with an access link between the UE and the repeater and the licensed frequency band and the licensed synchronization raster are associated with a direct link between the UE and the network entity.

Clause 35: The method of any combination of Clauses 33-34, wherein the initial SIB indicates a first random access channel (RACH) configuration associated with the licensed frequency band and with the licensed synchronization raster and a second RACH configuration associated with the unlicensed frequency band and with the unlicensed synchronization raster.

Clause 36: The method of Clause 35, wherein the first RACH configuration associated with the unlicensed synchronization raster includes a maximum RACH listen-before-talk (LBT) failure threshold parameter.

Clause 37: The method of any combination of Clauses 35-36, wherein the first RACH configuration associated with the unlicensed synchronization raster includes an indication to refrain from performing power boosting when sending a RACH request message for a serving cell via the unlicensed frequency band.

Clause 38: The method of any combination of Clauses 35-37, wherein the first RACH configuration associated with the unlicensed synchronization raster includes an indication to skip performing a listen-before-talk (LBT) procedure when sending a RACH request message for a serving cell via the unlicensed frequency band.

Clause 39: The method of any combination of Clauses 35-38, wherein the first RACH configuration associated with the unlicensed synchronization raster includes an indication to perform a short listen-before-talk (LBT) procedure when sending a RACH request message for a serving cell via the unlicensed frequency band.

Clause 40: The method of any combination of Clauses 35-39, wherein the first RACH configuration associated with the unlicensed synchronization raster includes a maximum transmit power for sending a RACH request message for a serving cell via the unlicensed frequency band.

Clause 41: The method of any combination of Clauses 35-40, wherein the first RACH configuration associated with the unlicensed synchronization raster includes a maximum number of repetitions for sending a RACH request message for a serving cell via the unlicensed frequency band.

Clause 42: The method of any combination of Clauses 35-41, wherein the initial SIB indicates for the UE to use the unlicensed frequency band only for uplink transmission to a serving cell.

Clause 43: The method of any combination of Clauses 35-42, wherein the initial SIB indicates for the UE to use the unlicensed frequency band only for downlink reception from a serving cell.

Clause 44: The method of any combination of Clauses 35-43, wherein the initial SIB indicates for the UE to use the unlicensed frequency band for both uplink transmission to a serving cell and downlink reception from a serving cell.

Clause 45: The method of any combination of Clauses 35-44, further comprising receiving control information configuring the repeater to translate transmissions from the network entity on the licensed frequency to the unlicensed frequency band and to forward the translated transmissions to the UE.

Clause 46: The method of any combination of Clauses 35-45, wherein the control information is received from the network entity over a control link.

Clause 47: An apparatus, comprising: at least one memory comprising executable instructions; and at least one processor configured to execute the executable instructions and cause the apparatus to perform a method in accordance with any one of Clauses 1-46.

Clause 48: An apparatus, comprising means for performing a method in accordance with any one of Clauses 1-46.

Clause 49: A non-transitory computer-readable medium comprising executable instructions that, when executed by at least one processor of an apparatus, cause the apparatus to perform a method in accordance with any one of Clauses 1-46.

Clause 50: A computer program product embodied on a computer-readable storage medium comprising code for performing a method in accordance with any one of Clauses 1-46.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a graphics processing unit (GPU), a neural processing unit (NPU), a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance of the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

Means for receiving, means for monitoring, means for determining, means for refraining, means for configuring, means for outputting, and means for forwarding may comprise one or more processors, such as one or more of the processors described above with reference to FIG. 13, FIG. 14, and FIG. 15.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) comprising:

memory storing computer executable code; and at least one processor coupled with the memory and configured to the execute computer executable code to cause the UE to:

receive, via a repeater, a synchronization signal (SS) burst in an unlicensed frequency band associated with an unlicensed synchronization raster, wherein the SS burst includes at least one SS block (SSB), and wherein the at least one SSB includes a physical broadcast channel (PBCH) carrying a master information block (MIB) indicating an initial control resource set (CORESET) via a mapping associated with the unlicensed frequency band; and monitor the initial CORESET, based on the MIB and the mapping associated with the unlicensed frequency band, for a physical downlink control channel (PDCCH) transmission scheduling a physical downlink shared channel (PDSCH) transmission carrying an initial system information block (SIB) associated with a cell that uses a licensed frequency band associated with a licensed synchronization raster.

2. The UE of claim 1, wherein the at least one processor is further configured to cause the UE to determine that the at least one SSB is associated with the cell based on the SSB being received at the synchronization raster location in the unlicensed frequency band.

3. The UE of claim 1, wherein the unlicensed frequency band is associated with an access link between the UE and the repeater, and wherein the licensed frequency band is associated with a direct link between the UE and a network entity providing the cell.

4. The UE of claim 1, wherein the at least one processor is further configured to cause the UE to:

receive, on the licensed frequency band, a second SS burst, wherein the second SS burst includes a second SSB, the second SSB including a second PBCH carrying a second MIB indicating a second initial CORESET via a mapping associated with the unlicensed frequency band, wherein the second SS burst includes an indication to refrain from decoding PDCCH resources in the second initial CORESET if the second SS burst is received on the licensed frequency band; and refrain from monitoring in the second initial CORESET based on the indication and based on receiving the second MIB in the licensed frequency band.

5. The UE of claim 1, wherein the at least one processor is further configured to cause the UE to:

receive, on the licensed frequency band, a second SS burst from the cell, wherein the second SS burst includes a second SSB, the second SSB including a second PBCH carrying a second MIB indicating a second initial CORESET via a mapping associated with the unlicensed frequency band;

receive a second SIB in the second initial CORESET indicated in the second MIB according to a mapping associated with the licensed frequency band, wherein the second SIB indicates the UE is barred from decoding PDCCH resources in the second initial CORESET; and refrain from monitoring in the second initial CORESET based on the indication in the second SIB.

6. The UE of claim 1, wherein the initial SIB indicates a first random access channel (RACH) configuration associated with the licensed frequency band and a second RACH configuration associated with the unlicensed frequency band.

7. The UE of claim 6, wherein the second RACH configuration associated with the raster frequency band includes a maximum RACH listen-before-talk (LBT) failure threshold parameter.

8. The UE of claim 7, wherein the at least one processor is further configured to cause the UE to:

determine to send a RACH request message for the cell via the unlicensed frequency band;

perform an LBT procedure in response to the determination to send the RACH request message; and refrain from sending the RACH request message in response to a number of LBT failures satisfying the maximum RACH LBT failure threshold.

9. The UE of claim 6, wherein the second RACH configuration associated with the unlicensed frequency band includes an indication to refrain from applying power boosting to a RACH request message for the cell via the unlicensed frequency band.

10. The UE of claim 6, wherein the second RACH configuration associated with the unlicensed frequency band includes an indication to skip performing a listen-before-talk (LBT) procedure before sending a RACH request message for the serving cell via the unlicensed frequency band.

11. The UE of claim 6, wherein the second RACH configuration associated with the unlicensed frequency band includes an indication to perform a short listen-before-talk (LBT) procedure before sending a RACH request message for the cell via the unlicensed frequency band.

12. The UE of claim 6, wherein the second RACH configuration associated with the unlicensed frequency band includes a maximum transmit power for sending a RACH request message for the cell via the unlicensed frequency band.

13. The UE of claim 6, wherein the second RACH configuration associated with the unlicensed frequency band includes a maximum number of repetitions for sending a RACH request message for the cell via the unlicensed frequency band.

14. The UE of claim 6, wherein the initial SIB indicates for the UE to use the unlicensed frequency band only for uplink transmission to the cell.

15. The UE of claim 6, wherein the initial SIB indicates for the UE to use the unlicensed frequency band only for downlink reception via the repeater from the cell.

16. The UE of claim 6, wherein the initial SIB indicates for the UE to use the unlicensed frequency band for both uplink transmission to the cell and downlink reception via the repeater from the cell.

17. A network entity comprising:

memory storing computer executable code; and at least one processor coupled with the memory and configured to the execute computer executable code to cause the network entity to:

configure a repeater associated with the network entity to translate transmissions by the network entity on a licensed frequency band associated with a licensed synchronization raster to an unlicensed frequency band associated with an unlicensed synchronization raster; and output, on the licensed frequency band, a synchronization signal (SS) burst, wherein the SS burst includes at least one SS block (SSB), and wherein the at least one SSB includes a physical broadcast channel (PBCH) carrying a master information block (MIB) indicating an initial control resource set (CORESET) according to a mapping associated with the unlicensed frequency band.

18. The network entity of claim 17, wherein the at least one processor is further configured to cause the network entity to output a physical downlink control channel (PDCCH) transmission on PDCCH resources associated with the initial CORESET based on the MIB and the mapping associated with the unlicensed frequency band, wherein the PDCCH transmission schedules a physical downlink shared channel (PDSCH) transmission carrying an initial system information block (SIB).

19. The network entity of claim 17, wherein the unlicensed frequency band is associated with an access link between the UE and the repeater, and wherein the licensed frequency band is associated with a direct link between the UE and the network entity or a backhaul link between the network entity and the repeater.

20. A repeater comprising:

memory storing computer executable code; and at least one processor coupled with the memory and configured to the execute computer executable code to cause the repeater to:

receive, from a network entity, a synchronization signal (SS) burst on a licensed frequency band associated with a licensed synchronization raster, wherein the SS burst includes at least one SS block (SSB), and wherein the at least one SSB includes a physical broadcast channel (PBCH) carrying a master information block (MIB) indicating an initial control resource set (CORESET) via a mapping associated with an unlicensed frequency band that is associated with an unlicensed synchronization raster;

forward, on the unlicensed frequency band, the SS burst to a user equipment (UE); and forward, to the UE on the unlicensed frequency band, a physical downlink control channel (PDCCH) transmission on PDCCH resources associated with the initial CORESET according to the mapping associated with the unlicensed frequency band, wherein the PDCCH transmission schedules a physical downlink shared channel PDSCH) transmission carrying an initial system information block (SIB) associated with a cell operating on the licensed frequency band.

* * * * *